(12) United States Patent
Izaki et al.

(10) Patent No.: US 9,754,146 B2
(45) Date of Patent: Sep. 5, 2017

(54) PORTABLE OPTICAL READER

(71) Applicant: Keyence Corporation, Osaka (JP)

(72) Inventors: Tomomi Izaki, Osaka (JP); Taichi Tajika, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/298,252

(22) Filed: Oct. 20, 2016

(65) Prior Publication Data

US 2017/0140187 A1 May 18, 2017

(30) Foreign Application Priority Data

Nov. 13, 2015 (JP) ................................. 2015-222596

(51) Int. Cl.
*G06K 7/10* (2006.01)
(52) U.S. Cl.
CPC ..... *G06K 7/10831* (2013.01); *G06K 7/10742* (2013.01); *G06K 7/10841* (2013.01); *G06K 7/10881* (2013.01)
(58) Field of Classification Search
CPC ........... G06K 7/10742; G06K 7/10831; G06K 7/10841; G06K 7/10881; G02B 27/28
USPC .................................................... 235/472.01
See application file for complete search history.

(56) References Cited

U.S. PATENT DOCUMENTS

| | | | | |
|---|---|---|---|---|
| 5,010,241 A * | 4/1991 | Butterworth | ....... | G06K 7/10594 235/454 |
| 5,541,419 A * | 7/1996 | Arackellian | ....... | G06K 7/10831 235/470 |
| 5,572,007 A * | 11/1996 | Aragon | .............. | G06K 7/10881 235/462.35 |
| 6,098,887 A * | 8/2000 | Figarella | ............ | G06K 7/10742 235/462.22 |
| 6,601,768 B2 * | 8/2003 | McCall | .............. | G06K 7/10732 235/454 |
| 7,083,097 B2 * | 8/2006 | Toyama | ............. | G06K 7/10732 235/454 |
| 8,600,196 B2 * | 12/2013 | King | ...................... | G06Q 30/00 358/474 |
| 2009/0277963 A1 * | 11/2009 | Van Kerkhoven | ..... | G03B 13/18 235/462.21 |

(Continued)

FOREIGN PATENT DOCUMENTS

| | | |
|---|---|---|
| JP | 2011-060101 A | 3/2011 |
| JP | 2011-170536 A | 9/2011 |

*Primary Examiner* — Claude J Brown
(74) *Attorney, Agent, or Firm* — Kilyk & Bowersox, P.L.L.C.

(57) ABSTRACT

A portable optical reader is provided with LED light sources 2911 to 2914; a diffusion plate 23 diffusing the light emitted from the LED light sources 2911 to 2914; an opening 2431 formed on the diffusion plate 23 transmitting diffusion reflecting light; an imaging part 41 receiving the diffusion reflecting light through the opening 2431; a LED light source 2915 emitting the light to the symbol; a light projection polarizing element 242 polarizing the light emitted from the LED light source 2915; an opening 2432 formed in the diffusion plate 23 transmitting the polarized light emitted from the LED light source 2915; and a light reception polarizing element 241 polarizing the diffusion reflecting light which is the polarized light emitted from the LED light source 2915 and reflected on the symbol and transmitted through the opening 2431.

9 Claims, 28 Drawing Sheets

(56) References Cited

U.S. PATENT DOCUMENTS

2012/0168509 A1* 7/2012 Nunnink ............ G06K 7/10732
  235/455
2015/0115032 A1* 4/2015 Chi .................... G06K 7/10732
  235/455
2016/0034734 A1 2/2016 Nagata et al.

* cited by examiner

BLACK RESIN FOR
SUPPRESSING REFLECTIVITY

BLACK SILK OR BLACK RESIST
FOR SUPPRESSING REFLECTIVITY

PORTABLE OPTICAL READER

CROSS-REFERENCE TO RELATED APPLICATIONS

The present application claims foreign priority based on Japanese Patent Application No. 2015-222596, filed Nov. 13, 2015, the contents of which is incorporated herein by reference.

TECHNOLOGICAL FIELD

The present invention relates to a portable optical reader contributing miniaturization of a handy scanner while realizing both of diffused illumination and polarized illumination.

BACKGROUND ART

Conventionally, handy scanners, which are hand-held type scanners, are well known as devices to read symbols marked on products or packing boxes. Among the handy scanners, there is an imaging type handy scanner by which the light emitted from a light source such as LED, etc. is irradiated to symbols such as a two-dimensional code, etc., and the reflecting light is received by an imaging element such as CCD, etc. so as to read the symbols based on the image data.

Further, in the handy scanner, the technology which improves the reading performance of the symbols by irradiating diffused illumination with high uniformity from the reading port of the handy scanner by using a diffusion plate is well known. For example, in Patent Document 1 (JP 2011-60101), as shown in FIG. 29, an optical information reader 1001 emits marker lights MK1, MK3 formed by diffusion light from the first marker light irradiation part 1050*a* and the second marker light irradiation part 1050*c*. With this technology, as shown in FIG. 30, a plurality of light sources (light sources 1022*a* to 1022*m*) is arranged annularly in order to irradiate regular illumination which is different from the diffused illumination.

On the other hand, the technology which improves the reading performance for reading the symbols by polarizing the light from the light source in a polarized optical system and irradiating the polarized illumination to the symbols is well known.

For example, as shown in FIG. 31, Patent Document 2 (JP 2011-170536) discloses a handy type code reader 2002 in which the light emitted from the light source 2004 is polarized in the first polarizer 2003 and irradiates to the imaging object, and the reflecting light from the imaging object is polarized in the second polarizer 2005.

SUMMARY OF THE INVENTION

Problems to Be Solved by the Invention

However, in the handy scanner using the diffusion plate disclosed in Patent Document 1 (JP 2011-60101), when the polarized optical system (annular polarizer 2003, etc.) disclosed in Patent Document 2 (JP 2011-170536) is arranged in front of the plurality of light sources arranged around the reading port; that is, when both of the diffused illumination and the polarized illumination are realized in one handy scanner, there is a problem in which the illumination configuration became complicated in order to secure the sufficient amount of the light in the illumination and arrange the polarizing elements annularly. Further, there is a problem for the miniaturization of the handy scanner.

The present invention was made in consideration of the aforementioned problems. One of the objects in the present invention is to provide a portable optical reader contributing in the miniaturization of the handy scanner while realizing the both of the diffused illumination and the polarized illumination.

Means for Solving the Problems

According to the portable optical reader according to the first aspect of the present invention, it can be provided with a first light source emitting light to a symbol which is a reading object; a diffusion member diffusing the light emitted from the first light source; a first opening formed in the diffusion member to transmit a first reflecting light, the first reflecting light illuminated by the diffusion member and reflected on the symbol; an imaging part generating (taking) an image of the symbol by receiving the first reflecting light through the first opening; a head part housing (storing) the first light source, the diffusion member, and the imaging part; a holding part continuously connected (provided) to the head part and extending in a continuously connecting direction; a second light source emitting light to the symbol which is the reading object; a second polarizing element polarizing the light emitted from the second light source; an opening surface formed in the diffusion member, the opening surface having a second opening to transmit a polarized light emitted from the second light source, and polarized by the second polarizing element; and a first polarizing element polarizing a second reflecting light which is the polarized light transmitted through the second opening and reflected on the symbol and transmitted through the first opening. With the aforementioned structure, the first opening is provided in the diffusion member. A single opening is shared for receiving the diffused illumination and the polarized illumination through the first polarizing element for receiving light, and generating (taking) an image by the diffused illumination and the polarized illumination is also performed in a single imaging part. Further, in the configuration of the diffused illumination, the second opening is provided in the diffusion member. By incorporating the structure of the polarized illumination to be able to project polarized illumination through the second polarizing element, while realizing both of the diffused illumination and the polarized illumination, it can be significantly miniaturized in comparison with the structure in which the diffused illumination and the polarized illumination are configured as a separate body.

Further, according to the portable optical reader according to the second aspect of the present invention, the second opening can be provided in vicinity of the first opening on the opening surface. With the aforementioned structure, the first opening for light receiving and the second opening for light projecting are provided in vicinity, so that the imaging axis for generating (taking) an image by the imaging part and the light projecting axis of the polarized illumination can be set approximately parallel, and an appropriate illumination arrangement for the polarized illumination can be provided.

Further, according to the portable optical reader according to the third aspect of the present invention, the first opening and the second opening are continuously provided and form a single opening.

Further, according to the portable optical reader according to the fourth aspect of the present invention, the first opening and the second opening are separately provided side-by-side and form a separate opening.

Further, according to the portable optical reader according to the fifth aspect of the present invention, the first polarizing element and the second polarizing element are fixed to the diffusion member, respectively.

Further, according to the portable optical reader according to the sixth aspect of the present invention, the first polarizing element and the second polarizing element are continuously provided as a single member in which two polarizing elements have phases that differ from each other by 90 degrees. With the aforementioned structure, the polarizing elements can be arranged as a single member in a state in which the phases differ from each other by 90 degrees, so that it is unnecessary to separately arrange the polarizing elements by adjusting the direction of these elements.

Further, according to the portable optical reader according to the seventh aspect of the present invention, the diffusion member includes a rear end surface provided in the front side of the imaging part inside the head part, and a side surface continuously connected (provided) to the rear end surface, which surrounds an imaging axis of the imaging part, and provided in a manner in which the first light source is positioned outside the diffusion member. The first opening and the second opening are formed in the rear end surface. With this structure, the reading direction and the light projecting axis of the polarized illumination can be set approximately parallel, so that an appropriate illumination arrangement for the polarized illumination can be provided.

Further, according to the portable optical reader according to the eighth aspect of the present invention, the second light source is provided below the rear end surface of the diffusion member inside the head part.

Further, according to the portable optical reader according to the ninth aspect of the present invention, a reflector or a lens narrows an irradiation range of the light emitted from the second light source, and is provided between the second light source and the second polarizing element.

BRIEF DESCRIPTION OF THE DRAWINGS

FIG. 26A is a diagram when viewed from the outside of the head part; and FIG. 26B is a diagram when viewed from the inside of the head part;

EMBODIMENTS FOR CARRYING OUT THE INVENTION

Figure 1:
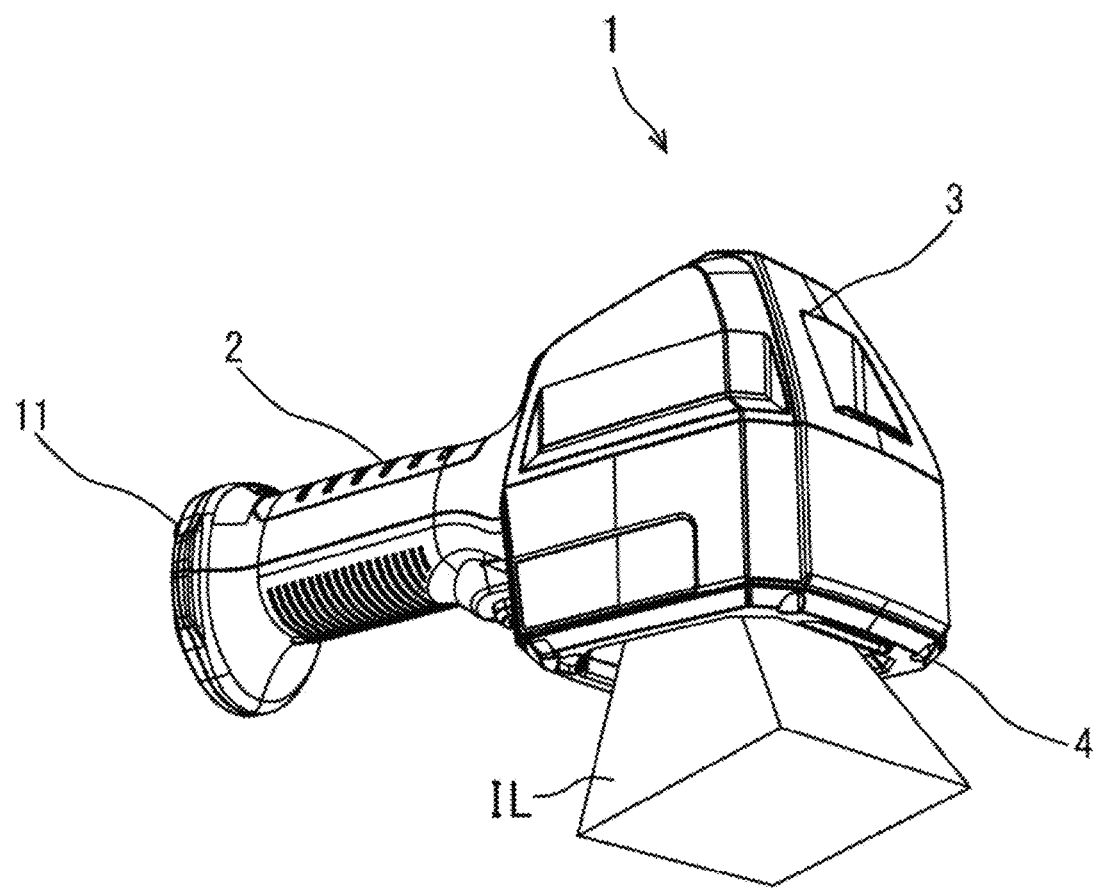
FIG. 1 is a schematic view showing a structure of a handy scanner according to one embodiment of the present invention.

Hereinafter, the embodiments of the present invention will be described in reference to the drawings. However, the following embodiments are each described to explain one example of a portable optical reader which realizes the technical scope of the present invention, and the present invention is not limited to the portable optical readers described below. Further, the present disclosure does not limit the elements described in the claims to the elements described in the embodiments. Specifically, the dimensions, materials, shapes, relative arrangements and so on of the elements described in the embodiments are not limited to the scope of the present disclosure to these alone in particular unless specifically described. Additionally, the sizes and the positional relationships, etc. of the elements in each of drawings are occasionally shown larger exaggeratingly for ease of explanation. Further, in the following descriptions, the same designations and the same reference numerals indicate the same or similar elements, and their description is omitted. In addition, a plurality of structural elements of the present invention may be shown as a single part that serves for the purpose of describing the plurality of elements, and on the other hand, a single structural element may be shown as a plurality of parts that serve for the purpose of describing the single element.

The basic principle of the portable optical reader (hereinafter referred to as "handy scanner") is to irradiate laser light and identify symbols such as bar code, etc. (hereinafter referred to as "bar code" or "code" as an example) by contrast of reflecting light. In recent years, in mobile phones or smartphones, two-dimensional code (QR Code (registered trademark) etc.) has widely become popular, and this symbol type cannot be scanned by laser light, so that it is captured by, mainly, a camera as an image and the image is analyzed to identify the code.

The optical reader can be broadly classified into a laser type optical reader and a camera type optical reader; in other words, it can be classified into a fixed type optical reader and a hand-held type optical reader. Generally, the fixed type optical reader may not be used in daily life, but it can be used in an automation line in, for example, a factory for traceability. For the hand-held type optical reader, there is a consumer product to be used in daily life such as cash register, or there is a chance to use the hand-held type optical reader in a factory where people work.

If it is further classified, there are an one-dimensional bar code and a two-dimensional bar code as kinds of codes. Many of the portable optical readers read symbols printed on papers or labels, but some of the portable optical readers read symbols directly printed on metal products or parts such as engines, etc. by using a laser marker, which is commonly called as Direct Part Marking (DPM).

The portable optical reader according to the present invention is a type which a user holds by hands for a reading work. Application targets are in various fields such as consumer products, DPM, etc., and are not particularly limited.

Further, for the symbols, in addition to an one-dimensional code or a two-dimensional code, the symbols include the combined symbols of the one-dimensional code and the two-dimensional code. The one-dimensional code is called as bar code or one-dimensional symbol, etc., and it may be Code 39, Code 128, etc.

The two-dimensional code is also called as two-dimensional bar code or two-dimensional symbol, etc., and there are QR Code (registered trademark), Micro QR Code, DataMatrix, VeriCode, AztecCode, PDF417, MicroPDF417, MaxiCode, etc.

Further, for the combined symbols, there are GS1 combined symbol, etc. in which the one-dimensional code and the two-dimensional code exist. Three types EAN/UPC (EAN-13, EAN-8, UPC-A, UPC-E), GS1-128, and GS1 data bar can be used as the one-dimensional code, which becomes the base, for the GS1 combined symbol. Further, two-dimensional codes MicroPDF417 or PDF417 can be used for additional information. Furthermore, the present embodiments can apply to the combination of a bar code and a matrix type two-dimensional code such as Micro QR Code, etc.

(Structure of Handy Scanner 1)

FIG. 1 is a schematic diagram showing the structure of a handy scanner 1 according to one embodiment of the present invention. In the drawing, reference numeral IL denotes illumination light. Hereinafter, for the sake of convenience, the respective surfaces are defined in conformity with the orthographic drawing method. The surface in the direction viewed from the reading port 4 side of the handy scanner 1 is defined as a front surface. The surface in the direction viewed from the head part 3 side is defined as a plane surface. The surface in the direction viewed from the end surface side of the holding part 2 is defined as a bottom surface. Further, the reading port 4 side of the handy scanner 1 is defined as a front side, and the opposite side of the handy scanner 1 is defined as a rear side.

Figure 2:
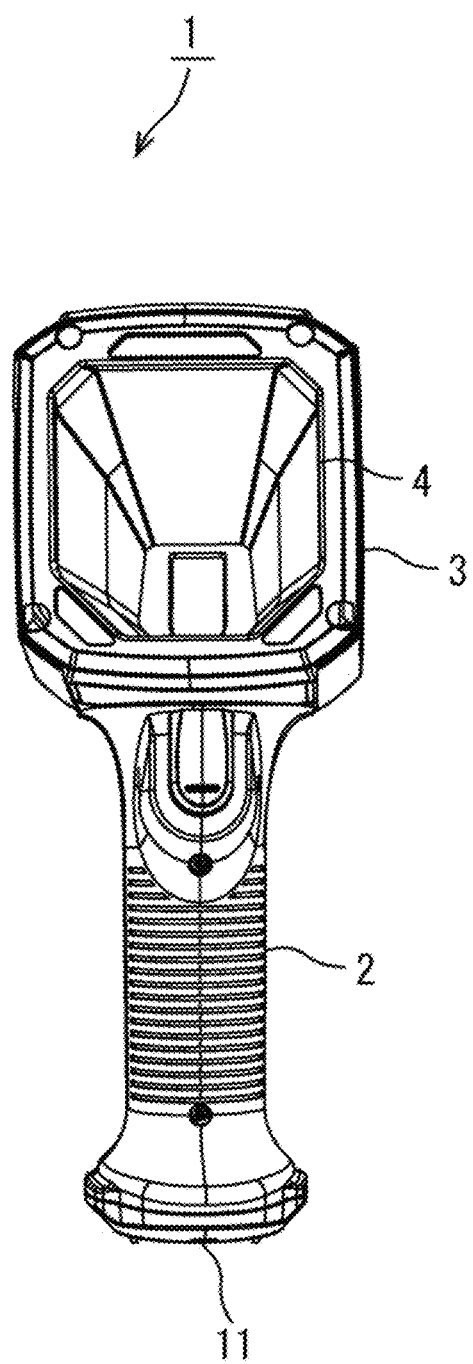
FIG. 2 is a front view of the handy scanner.
Figure 3:
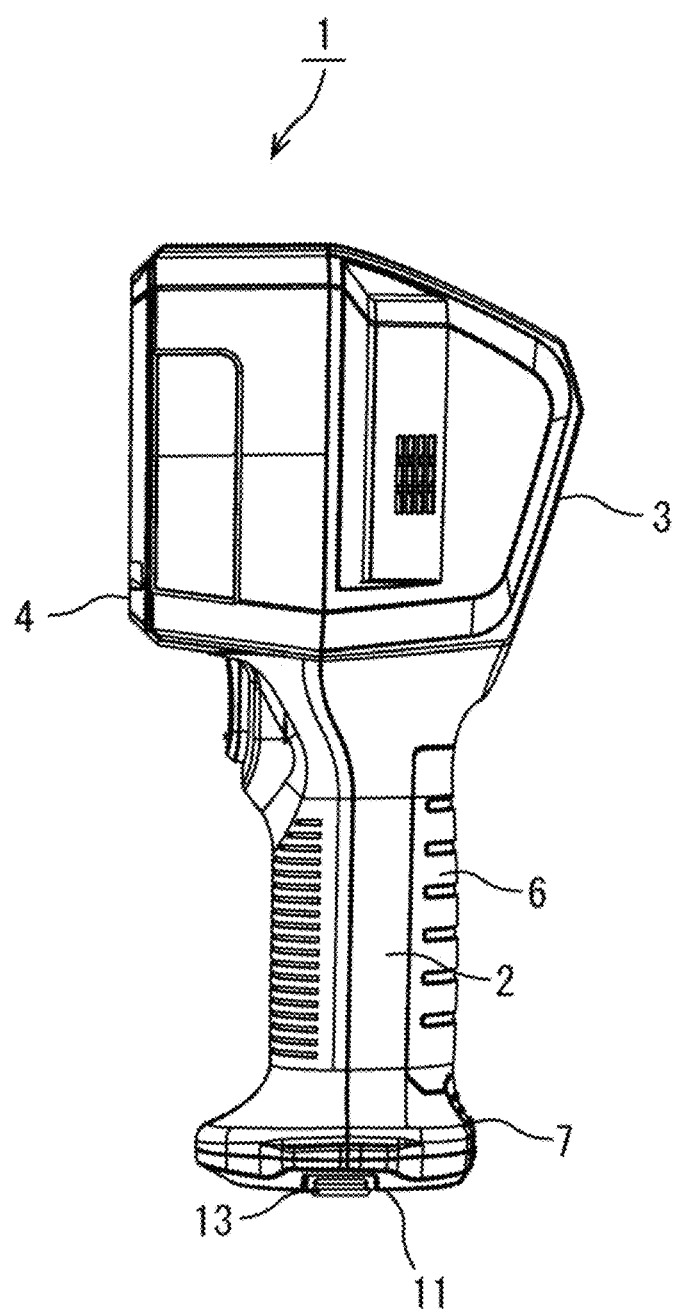
FIG. 3 is a right side view of the handy scanner.
Figure 4:
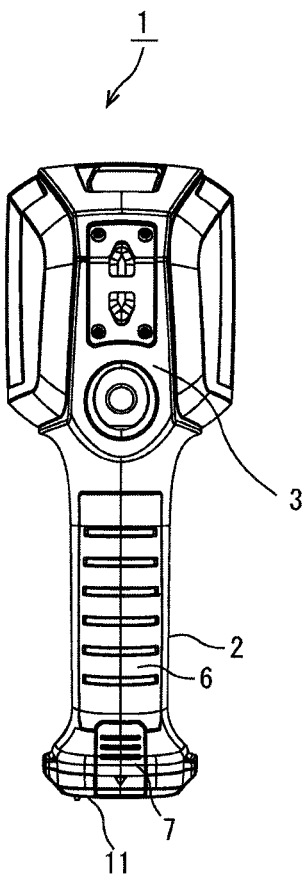
FIG. 4 is a rear view of the handy scanner.

FIG. 2 is a front view of the handy scanner 1. FIG. 3 is a right side view of the handy scanner 1. FIG. 4 is a rear view of the handy scanner 1. As shown in FIGS. 1 to 4, the handy scanner 1 is provided with, at the upper part of the front surface, a rectangular shaped reading port 4 for reading a bar code, and a head part 3 continuously formed on the both surfaces and the plane surface in the direction from the reading port 4 to the rear surface. Further, a holding part 2, which is held by the user, is continuously provided to the head part 3 in a continuously providing direction; that is, it extends in a direction of the bottom surface in a manner in which the outer shape becomes a substantially circular rod shape in the cross-section.

Figure 5:
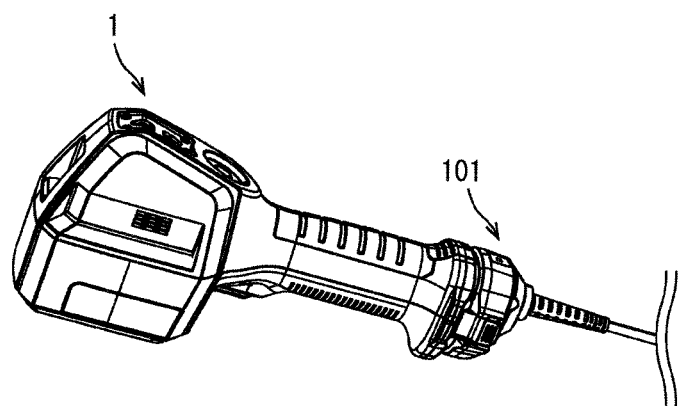
FIG. 5 is a diagram showing a state in which a charging unit and the handy scanner are connected.
Figure 6:
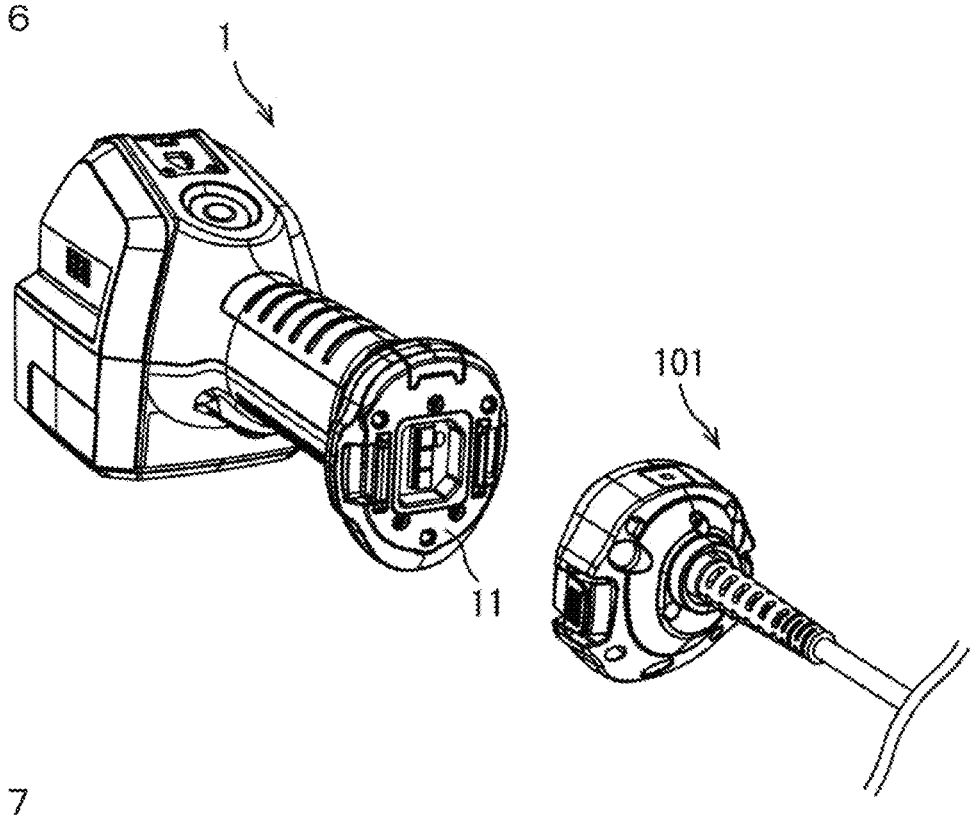
FIG. 6 is a diagram showing a state in which the handy scanner is removed from the charging unit.

An end surface is formed in the direction of the bottom surface of the holding part 2, and a charging unit connection part 11 is arranged on the end surface. A charging unit 101 is connected to the charging unit connection part 11. FIG. 5 is a diagram showing a state in which the handy scanner 1 is connected to the charging unit 101. FIG. 6 is a diagram showing a state in which the handy scanner 1 is removed from the charging unit 101. As shown in these drawings, the handy scanner 1 can be used while keeping the connection to the charging unit 101, or the handy scanner 1 can be used as a stand-alone wireless unit.

The battery 5 or the charging unit 101 supplies driving power in order to drive the handy scanner 1. However, if both of the battery 5 and the charging unit 101 can supply driving power, the one having higher voltage is prioritized. Normally, the charging unit 101 which has higher voltage supplies the driving power. As shown in the drawings, the user can perform a reading operation of bar code while keeping the state in which the handy scanner 1 is connected to the charging unit 101 without caring about the charging state of the battery 5, or regardless of existence of the battery 5.

Figure 7:
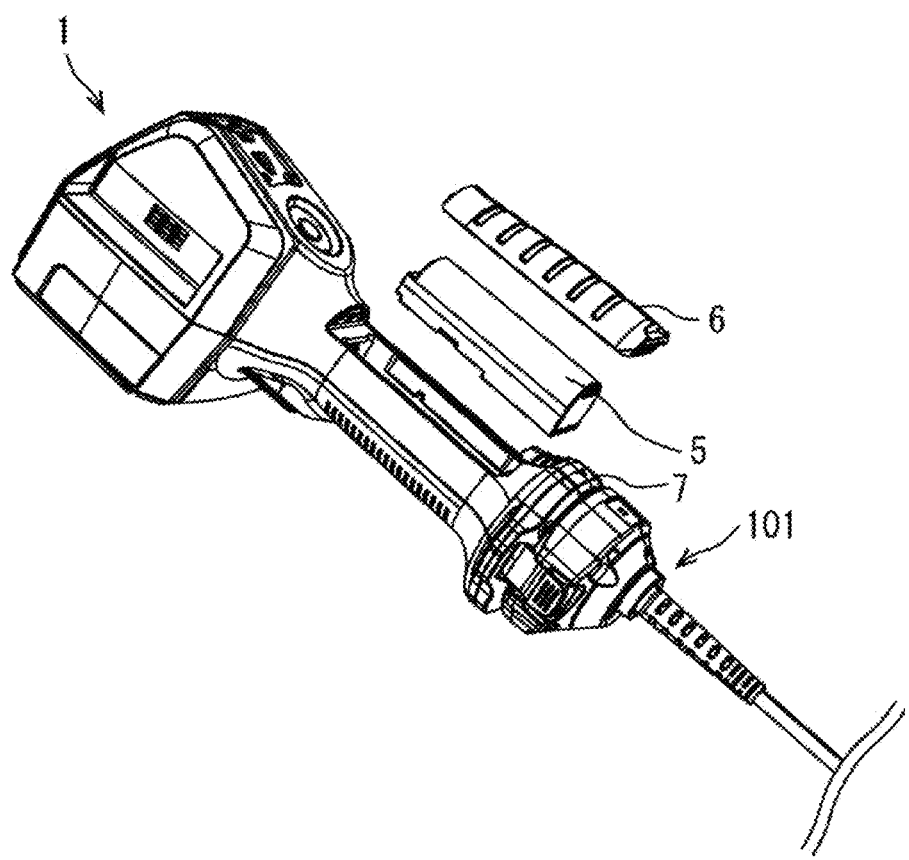
FIG. 7 is a diagram showing a state in which a battery is removed from the handy scanner.

FIG. 7 is a diagram showing a state in which the battery 5 is removed from the handy scanner 1. As shown in the drawing, the battery 5 has a cylindrical shape. For example, a lithium ion battery can be used, and it is housed (stored) inside the holding part 2 by closing a battery lid 6. A battery lid lock 7 is provided in the lower side of the battery lid 6 in FIG. 7. There is a structure in which when the user pushes the battery lid lock 7, the battery lid 6 opens.

Figure 8:
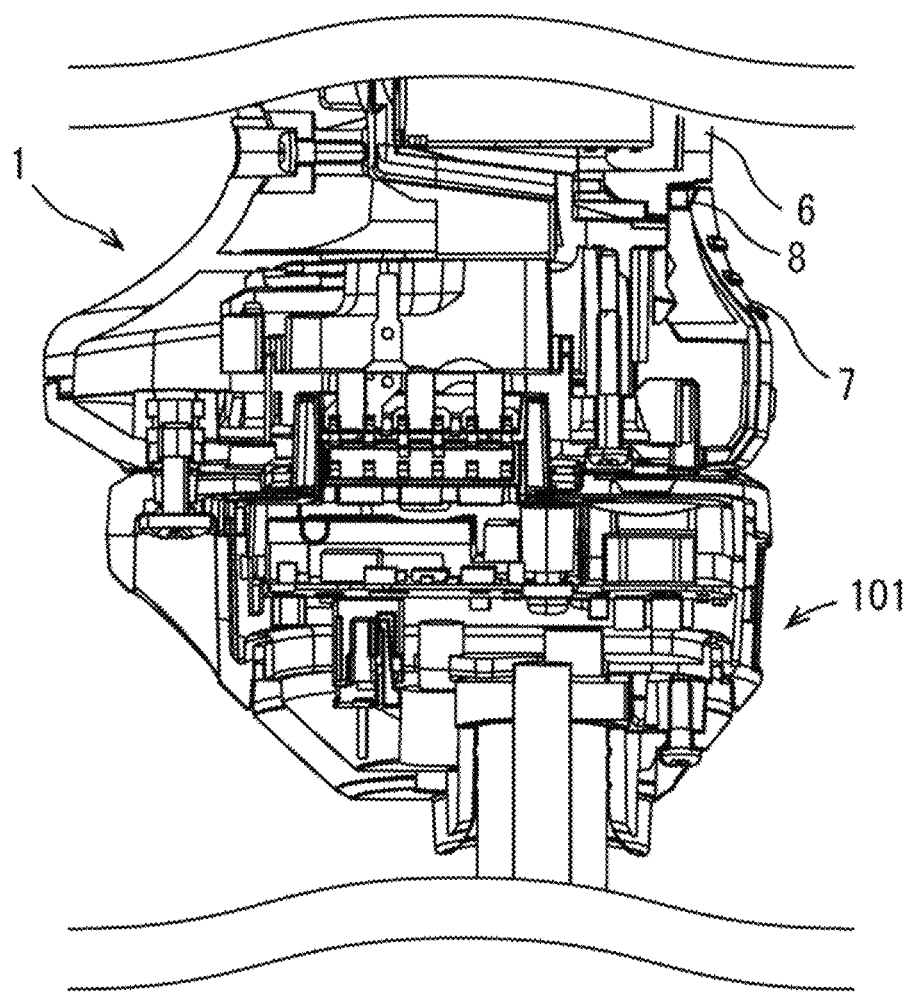
FIG. 8 is a partially enlarged cross-sectional view of a connection part when viewed from a right side direction in the state in which the handy scanner and the charging unit are connected.

FIG. 8 is a partially enlarged cross-sectional view of a connection part when viewed in a right side direction in a state in which the handy scanner 1 and the charging unit 101 are connected. As shown in the drawing, a nail is formed in the top end of the battery lid lock 7. In a state in which the battery lid lock 7 closes, the nail hooks to a projection 8 formed in the end part of the battery lid 6, and when the user pushes the battery lid lock 7, the battery lid 6 opens by releasing the nail formed in the top end. The battery lid lock 7 has a system in which the lock between the handy scanner 1 and the charging unit 101 releases at the same time when the battery lid 6 opens, so as to avoid the power supplied by the charging unit 101 at the time of the replacement of the battery 5.

Figure 9:
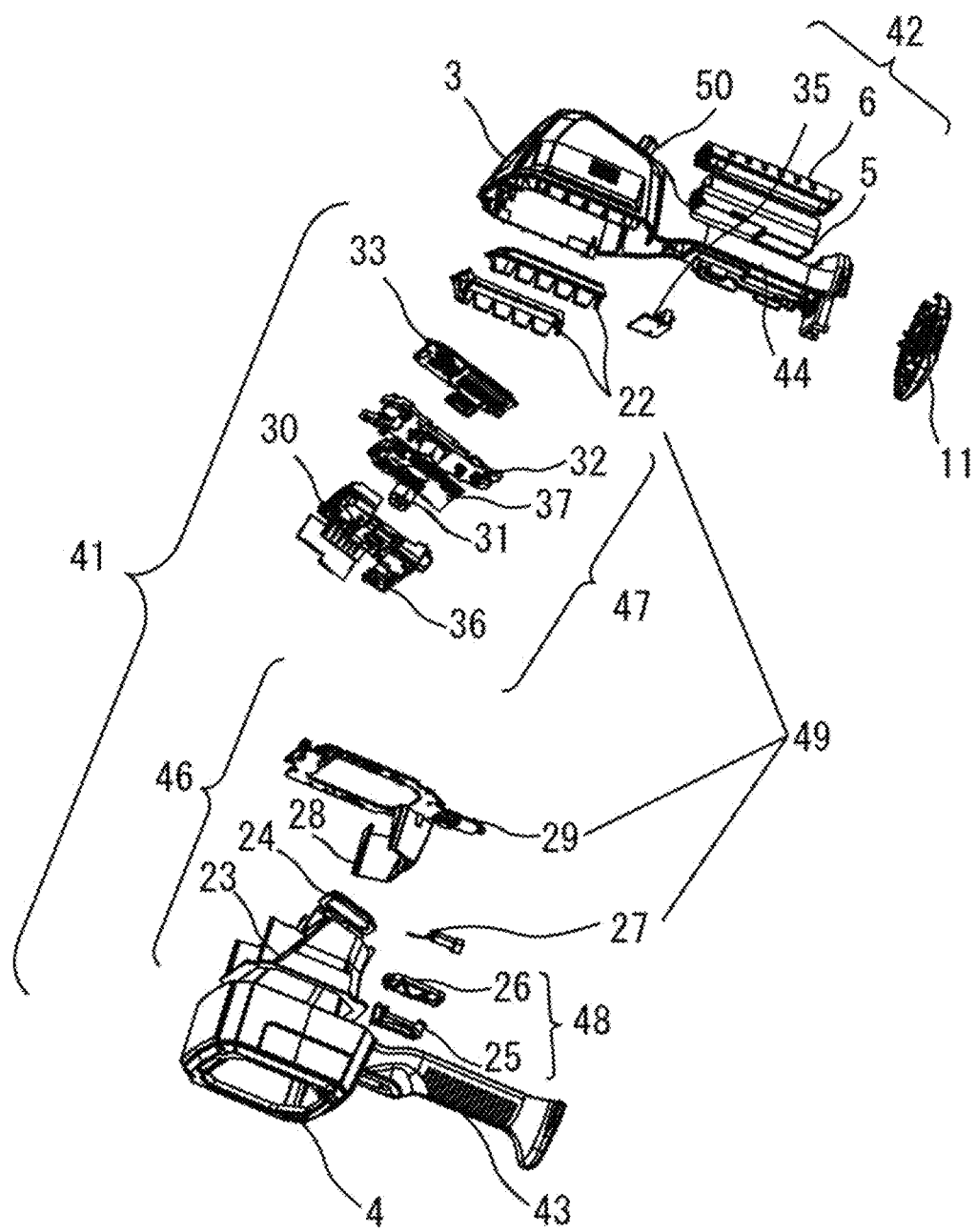
FIG. 9 is a structural diagram showing an inside structure of the handy scanner.
Figure 10:
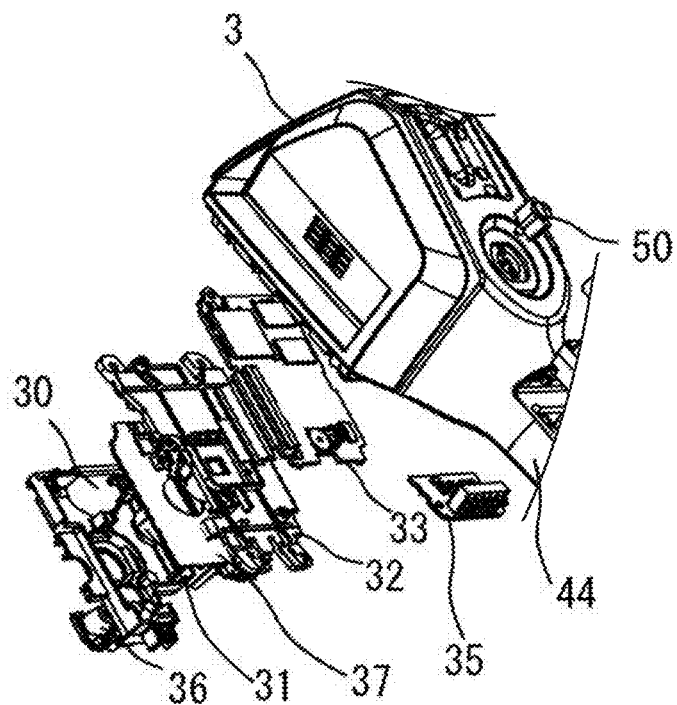
FIG. 10 is a structural diagram showing the inside structure of the handy scanner when viewed from an angle which is different from FIG. 9.
Figure 10:
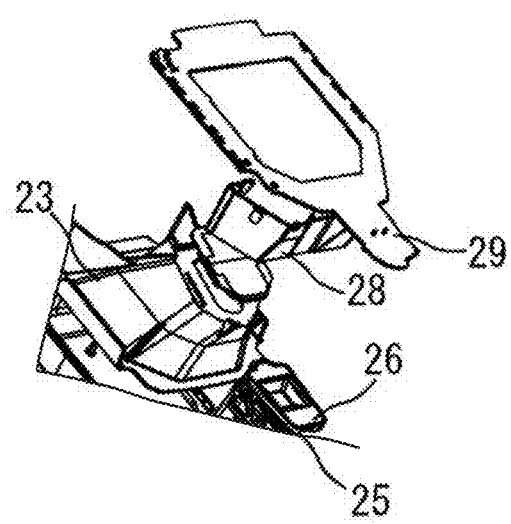
Figure 11:
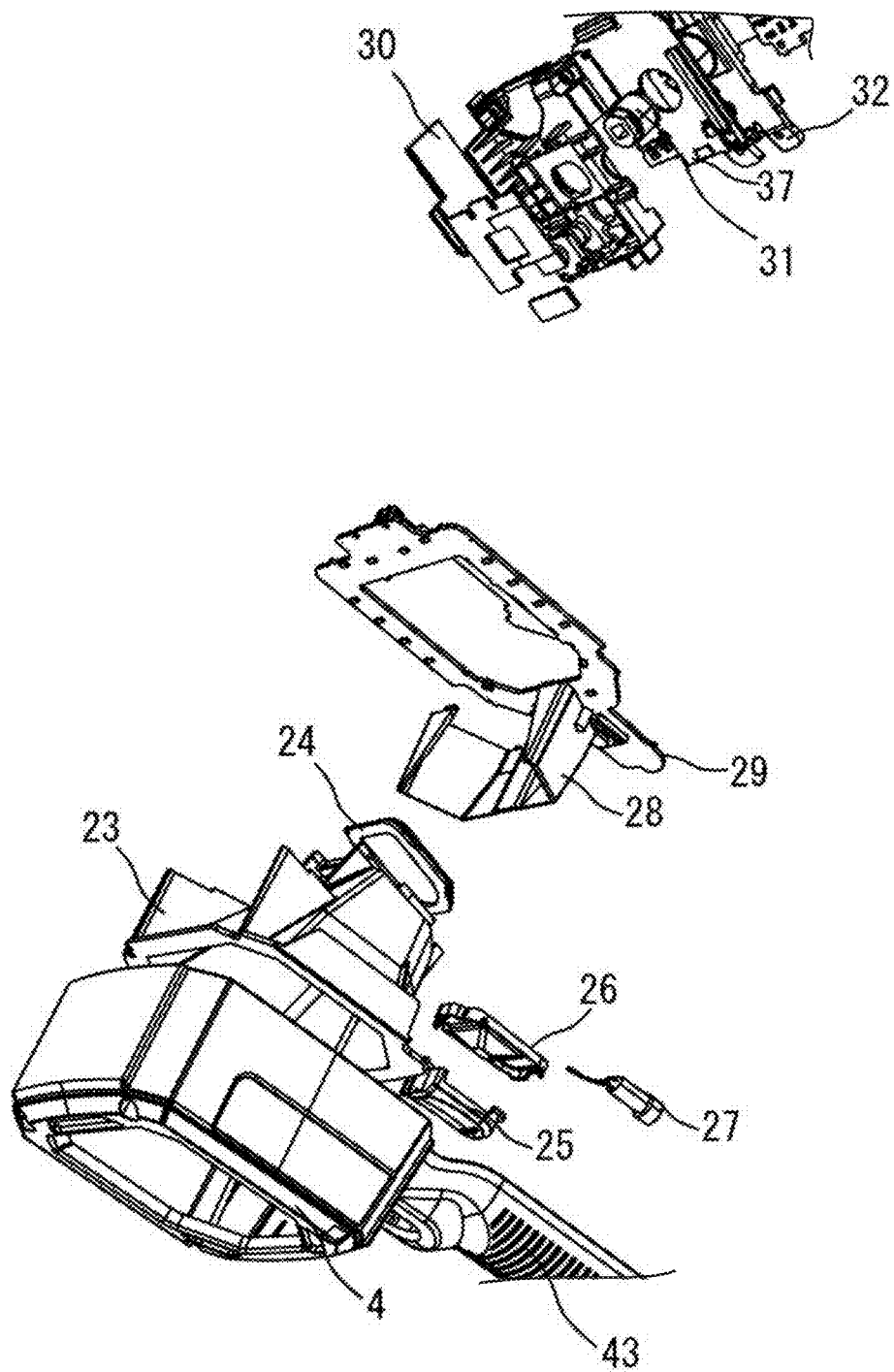
FIG. 11 is a structural diagram showing the inside structure of the handy scanner when viewed from an angle which is different from FIG. 9 and FIG. 10.

FIGS. 9 to 11 are structural diagrams showing an inside structure of the handy scanner 1. As shown in these drawings, mainly, the handy scanner 1 is provided with a front case 43, a reading part 41, a battery part 42, a rear case 44, and a charging unit connection part 11.

As shown in FIGS. 9 to 11, the reading part 41 is provided with the following main elements: a LED illumination 2915 (not shown) projecting LED illumination light IL to a reading object through a reflector 36 and a light projection polarizing element 242 of a polarizing element 24; LED illuminations 2911 to 2914 (not shown) emitting diffusion light IL from the side surface to the reading object through a diffusion plate 23; an illumination substrate 29 for controlling the LED illuminations 2911 to 2915; a light projecting part 46 including the reflecting plate 28 for efficiently reflecting the reflecting light which is useful for the reading; a camera frame 32; a camera cover 30; a light receiving lens 31 receiving the reflecting light from the reading object through a light reception polarizing element 241 of a polarizing element 24, in which the phase differs from the phase of the light projection polarizing element 242 by 90 degrees, and forming a light image; a light receiving part 47 including a CMOS image sensor 34 for providing a digital image from the light image formed in the light receiving lens 31; a trigger switch 25 operated by the user; a trigger packing 26; an operation part 48 including a function switch 50 for switching various modes; a notification part 49 including a vibrator 27, an indicator LED 21 (not shown), and an indicator lens 22 for notifying various information to the user; a communication part (not shown) for performing wireless communication, for example, Bluetooth (registered trademark) with a different communication unit (not shown) for sending the reading results to a Programmable Logic Controller (PLC) or a Personal Computer (PC); a main substrate 33 controlling the light projecting part 46, the light receiving part 47, the operation part 48, the notification part 49, and the communication part; and a power source substrate 37 for supplying power to various elements.

The battery part 42 is provided with, mainly, a cylindrically shaped 3.7V battery 5, the battery lid 6 for closing the storage of the battery 5, and the battery substrate 35 for supplying power from the battery 5 to the main substrate 33.

A front case 43 and a rear case 44 store the reading part 41 and the battery part 42, and form a housing by bonding both of the front case 43 and the rear case 44. The charging unit connection part 11 is provided to the end surface of the holding part 2 of the housing.

(Circuit Block of Handy Scanner 1)

Figure 12:
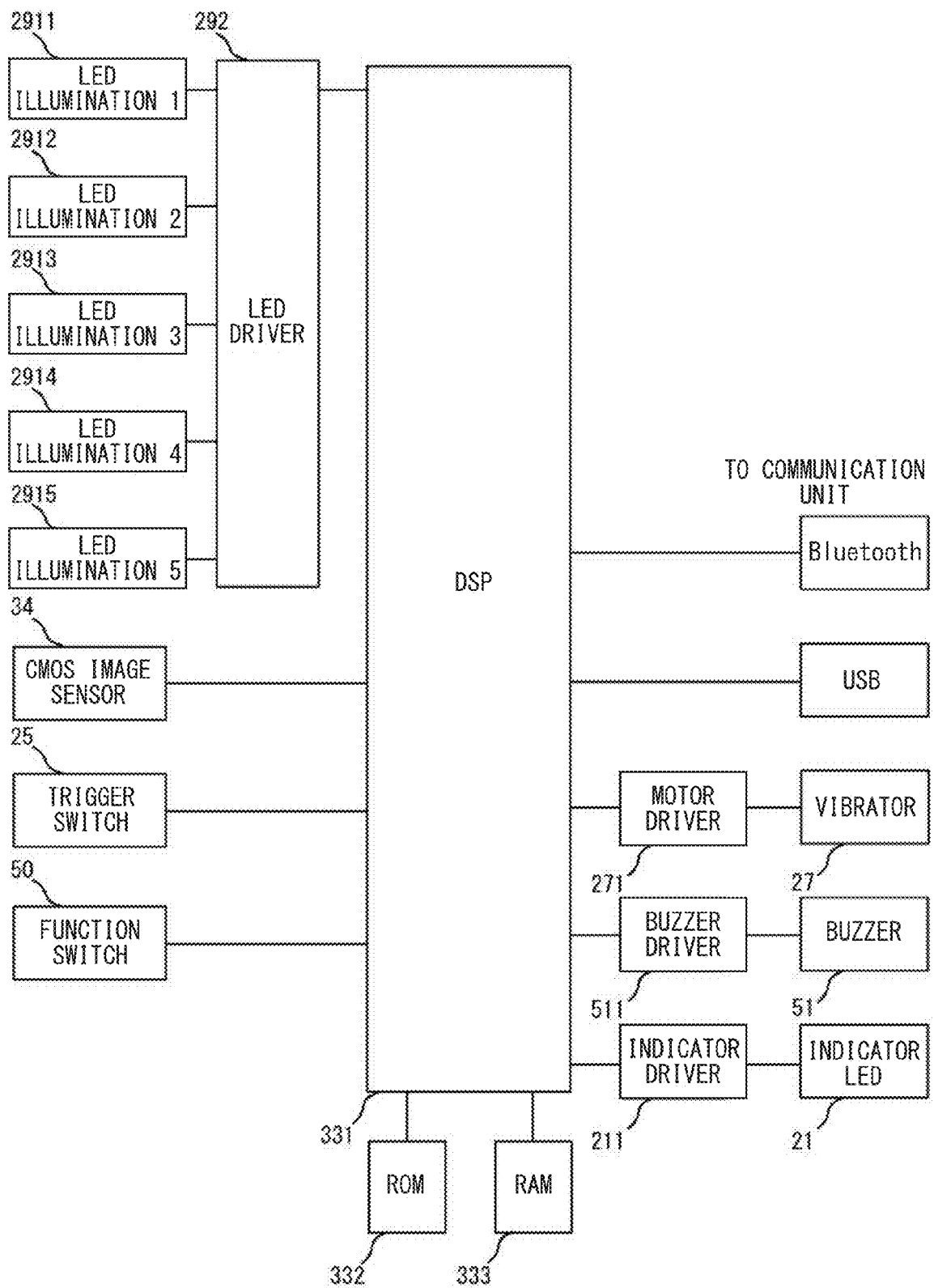
FIG. 12 is a block diagram showing a hardware structure of the handy scanner.

FIG. 12 is a block diagram showing a hardware structure of the handy scanner 1. As shown in FIG. 12, the main substrate 33 is provided with DSP 331, etc. so as to control the operations of the light projecting part 46 and the light receiving part 47 of the handy scanner 1, the operation part 48, and the notification part 49, and to execute the reading processing for an obtained image. Further, the main substrate 33 sends the reading results to the communication unit by operating the communication part.

When detecting the trigger switch ON, the DSP 331 controls to turn on the light in the LED illuminations 2911 to 2915 through a LED driver 292 in a mode based on the program or setting stored in a ROM 332 (or developed in a RAM 333). For example, blocks are formed by arranging the LED illuminations 2911 to 2914 respectively on the rear part of the diffusion plate 23 on the periphery so as to control to turn on the light in each of the blocks. By the block lighting, even though it is the diffused illumination, the illumination can be applied to a bar code in a specific direction. The block lighting will be described in detail later.

Next, the CMOS image sensor 34 stores image data in the RAM 333, and the DSP 331 performs a decode processing based on the image data stored in the RAM 333. When the reading processing completes, the communication part is controlled and the reading results are output by the Bluetooth (registered trademark). Further, the DSP 331 outputs sound to notify the completion of the proper reading from the buzzer 51 through the buzzer driver 511, and at the same time, operates the vibrator 27 through the motor driver 271. Furthermore, the DSP 331 controls to turn on the light in the indicator LED 21 through the indicator driver 211 to notify the completion of the reading or the progress of various processes to the user.

Figure 13:
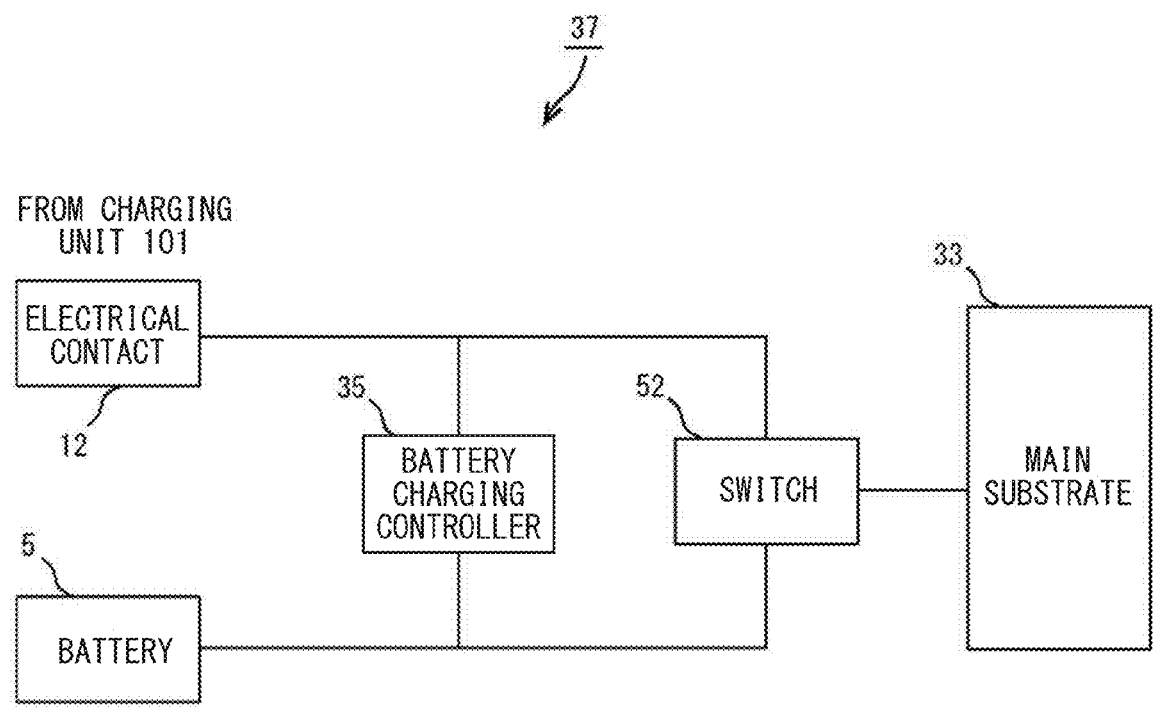
FIG. 13 is a block diagram showing a hardware structure for supplying power to a main substrate in a power source substrate.

FIG. 13 is a block diagram showing a hardware structure for supplying power to the main substrate 33 in the power source substrate 37. A predetermined voltage is applied to a system which supplies power from the charging unit 101 connected to an AC adapter through the electrical contact 12, and a predetermined voltage is applied to a system which supplies power from the battery 5. In the power source substrate 37, the switch 52 and the battery charging controller 35 are connected in parallel, so that it is possible to charge the battery 5 through the battery charging controller 35, or it is possible to supply power to the main substrate 33 through the switch 52. When the charging unit 101 connects to the handy scanner 1 and the battery 5 is stored in the handy scanner 1; that is, when both of them are connected, normally, the power is supplied to the main substrate 33 from the charging unit 101. In this case, when the voltage of the battery 5 is lower than the predetermined voltage, the battery 5 is charged.

Further, when the charging unit 101 is not connected to the handy scanner 1, the power is supplied from the battery 5. When the battery 5 is not stored in the handy scanner 1, the power is supplied from the charging unit 101.

(Block Lighting)

Figure 14:
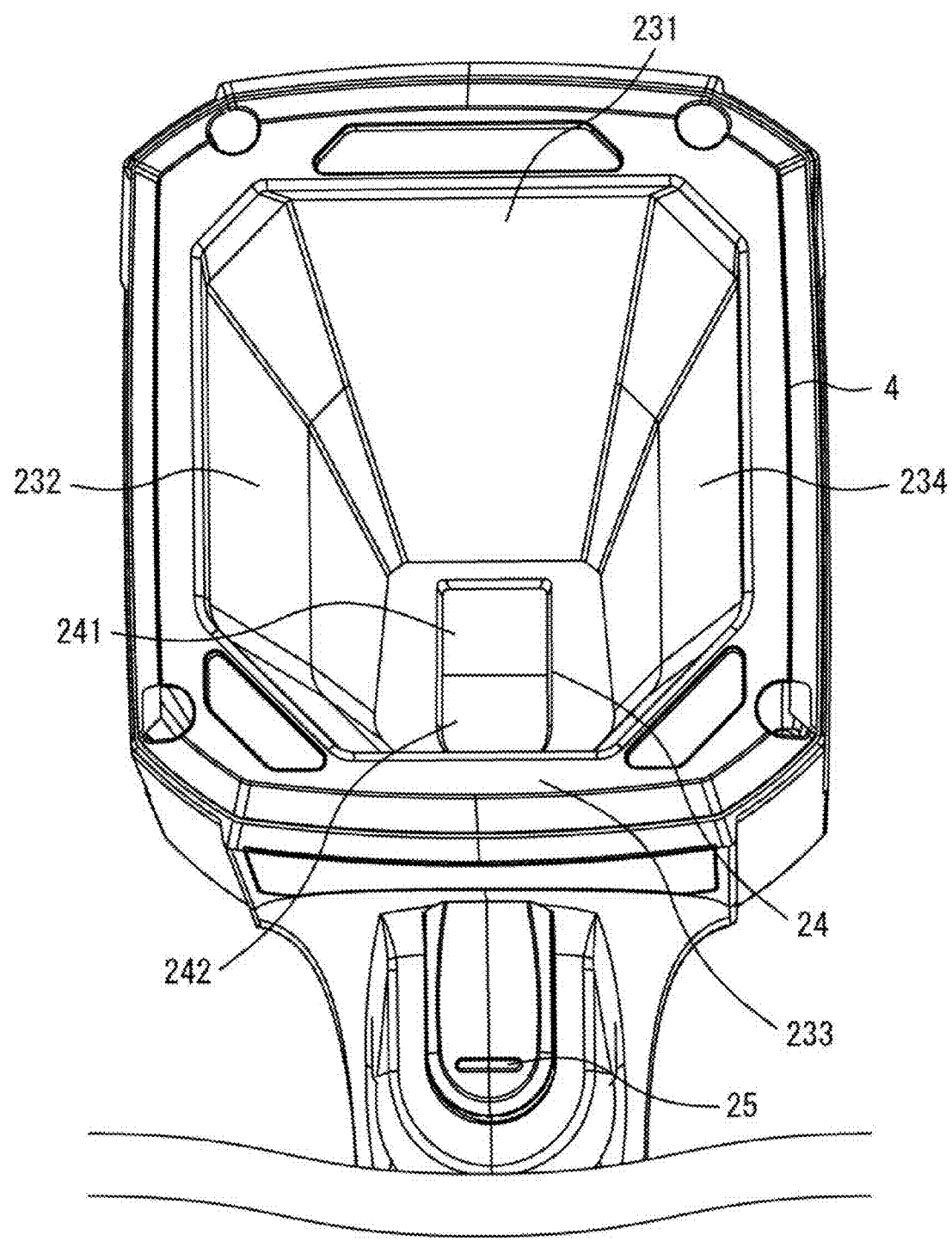
FIG. 14 is a front view of a head part of the handy scanner.

As one of the procedures to read a bar code having high obfuscation, there is a block lighting which turns on the illumination light in a block unit. FIG. 14 is a front view of a part of the head part 3. By the block lighting, as shown in the drawing, the diffusion plate 23 (corresponding to one example of "diffusion member" in the scope of the claims) is divided into four blocks in an upper side surface 231, a left side surface 232, a lower side surface 233, and a right side surface 234, so as to arbitrarily turn on the respective lights in a block unit. Therefore, by turning on the light in a specific block, the light can be applied to the bar code from a specific direction.

Figure 15:
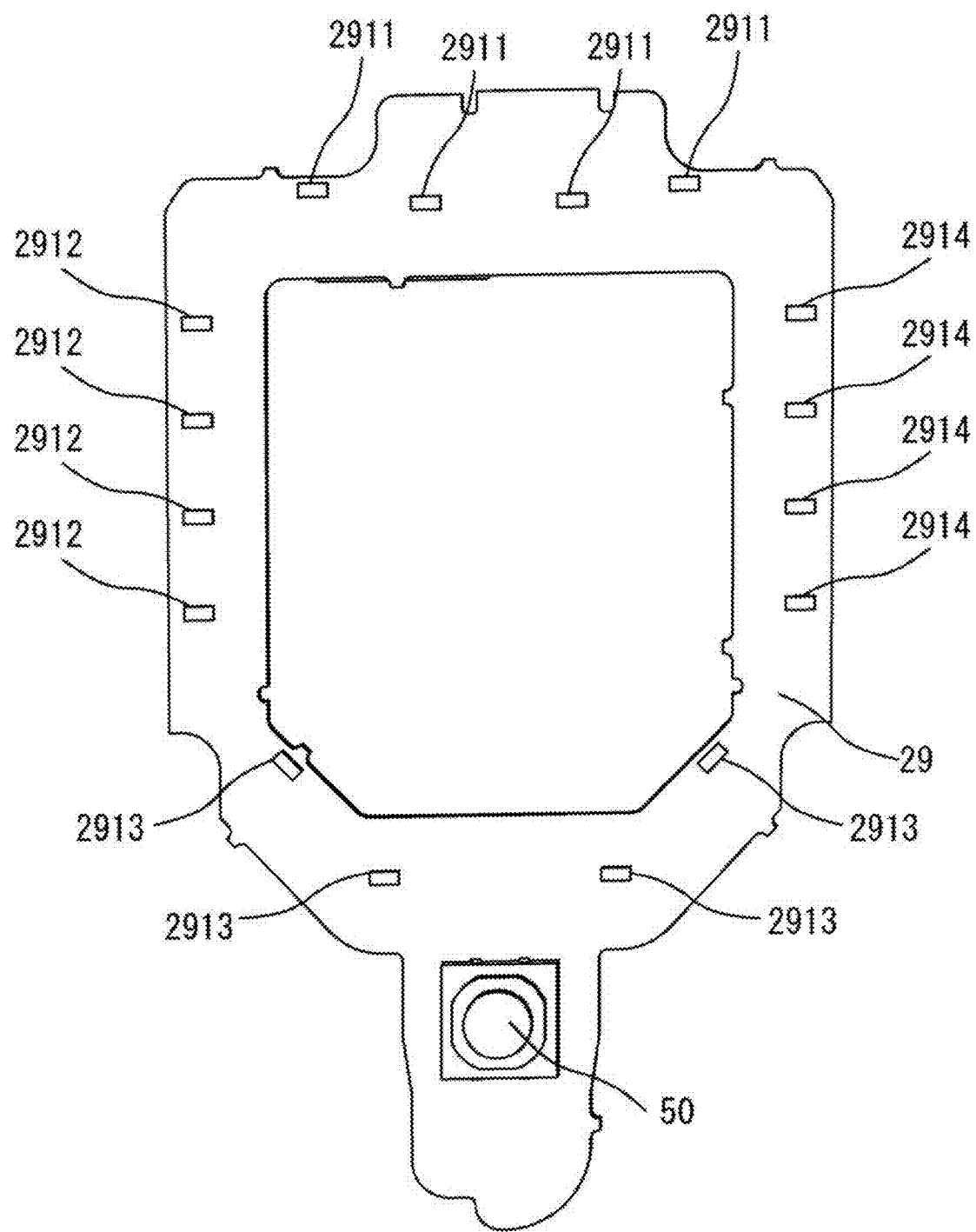
FIG. 15 is a schematic view of an illumination substrate of the handy scanner.

FIG. 15 is a schematic view of an illumination substrate 29 provided in the rear side of the diffusion plate 23. As shown in FIG. 15, in the illumination substrate 29, a LED illumination 2911, a LED illumination 2912, LED illumination 2913, and a LED illumination 2914 are arranged so as to correspond respectively to the upper side surface 231, the left side surface 232, the lower side surface 233, and the right side surface 234 of the diffusion plate 23. For example, four blue LEDs emitting blue light are respectively arranged in the LED illuminations 2911 to 2914 on the illumination substrate 29. The light emission angle of these LEDs is approximately 120 degrees, and the LED illumination light IL emits in a broad-shape. The lights are diffused when the LED illumination lights IL transmit through the diffusion plate 23, so that the luminance of the diffusion light becomes uniform. The diffusion plate 23 will be described in detail later.

One of the roles of the block lighting is to change a zenithal angle of the illumination light. For example, by performing block lighting in the lower side surface 233 which is approximately parallel to the imaging axis, the diffusion light can be obliquely emitted to the bar code, and by performing block lighting in the upper side surface 231 which is step-by-step or gradually released, the diffusion light can be emitted to the bar code in the direction which is close to the vertical direction.

The following is an advantage that allows to change the zenithal angle of the illumination. For example, in a case in which a bar code is marked by scratching as the DPM (direct part marking), and in a case in which the surrounding of the bar code is rough surface such as pear-skin (crepe-like asperity) or casting surface, when the diffusion light is obliquely applied, the light irregularly reflects on the rough surface, so that the bar code is appropriately read by receiving the reflecting light at the marked portion. On the other hand, in a case in which the incident light is easily reflected on a mirror surface around the bar code, the bar code is easily read by applying the diffusion light in the direction which is close to the vertical direction. That is, when the reading performance of the bar code changes depending on the zenithal angle of the illumination light, an excellent readability can be obtained by selecting an appropriate zenithal angle.

Further, another role of the block lighting is to change an azimuthal angle of the illumination light. For example, the upper side surface 231, the lower side surface 233, the left side surface 232, and the right side surface 234 are respectively arranged in up and down and right and left with respect to the imaging axis, so that by emitting them in a block unit, the diffusion light can be emitted to the bar code by changing the azimuthal angle.

The following is an advantage that allows to change an azimuthal angle of the illumination light. For example, to a hairline-shaped reading object marked by the DPM (direct part marking), there is a case in which the bar code cannot be appropriately read even though the illumination light is perpendicularly applied to the line direction of the hairline. On the contrary, there is a case in which the bar code can be read when the illumination light is applied in the line direction of the hairline. That is, when the readability of the bar code changes depending on an azimuthal angle of the illumination light, an excellent readability can be obtained by selecting an appropriate azimuthal angle.

(Structure of Diffusion Member)

Figure 16:
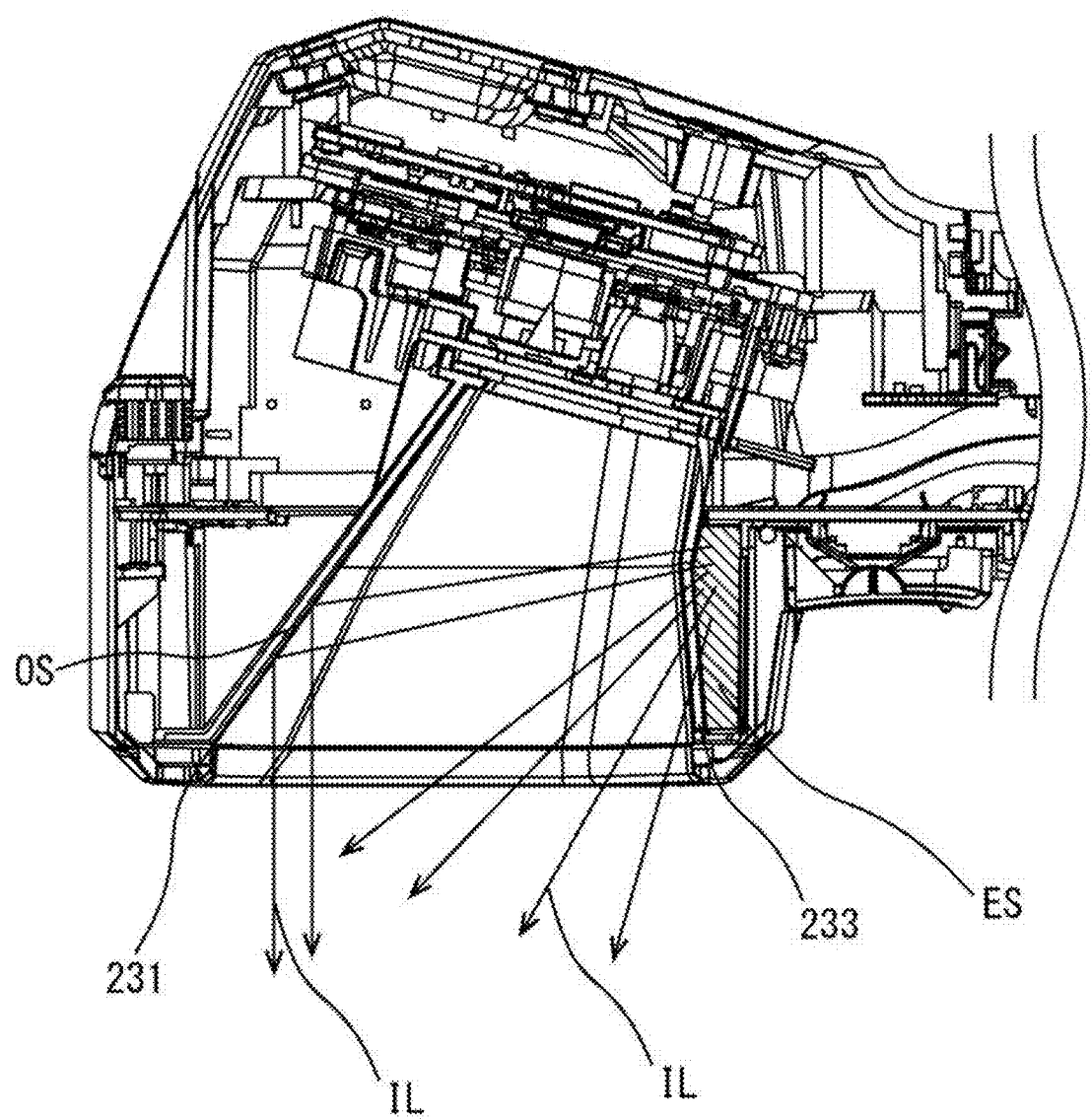
FIG. 16 is an explanatory diagram of an optical path when a diffusion plate does not transmit light.
Figure 17:
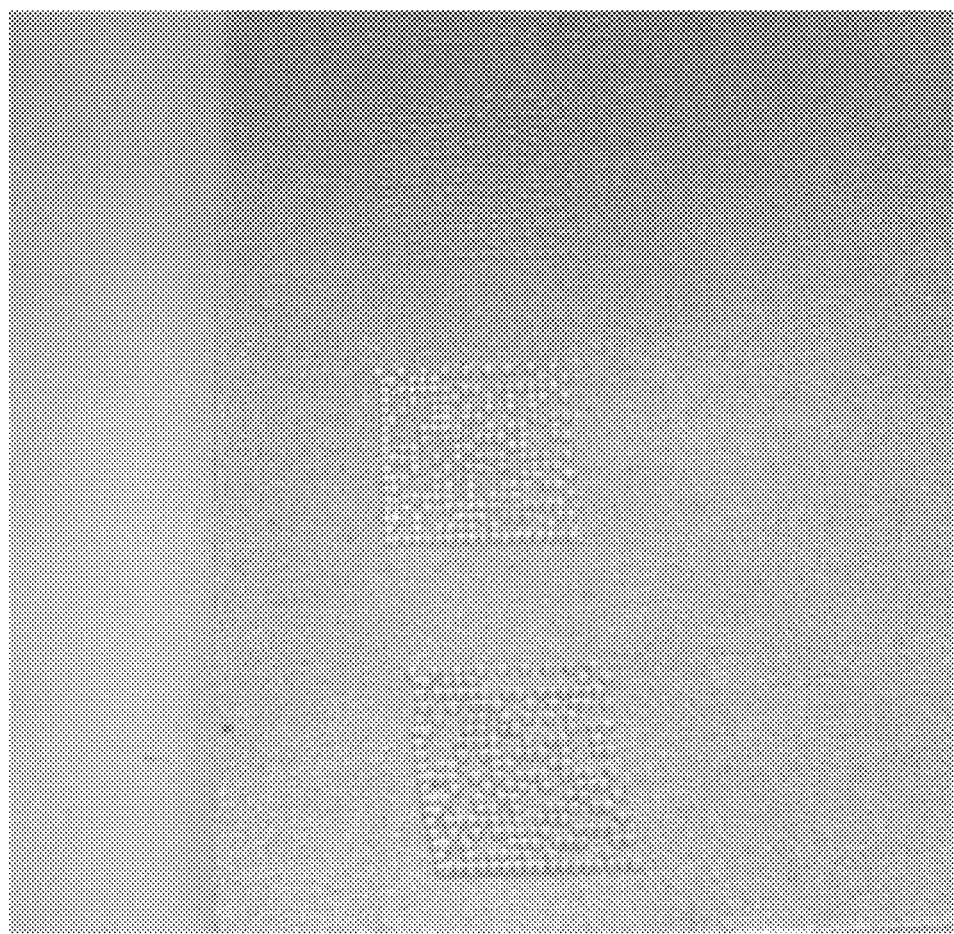
FIG. 17 is a digital image captured under lighting environment when the diffusion plate does not transmit light.

The case in which the block lighting is performed by turning on the LED illumination 291 from the rear side of the diffusion plate 23 is considered. For example, as shown in FIG. 16, when the block lighting is performed in the lower side surface 233, the LED illumination light emitted from the LED illumination 2913 irregularly reflects when the light transmits through the lower side surface 233 of the diffusion plate 23 so that the luminance of the diffusion light becomes uniform. In this drawing, the lower side surface 233 becomes a light emitting surface ES, and the upper side surface 231 which faces to the lower side surface 233 corresponds to an opposing surface OS. The diffusion light from the light emitting surface ES directly applies to a bar code, and an excellent reading can be performed if the reflecting light is received to capture an image. However, as shown in FIG. 16, a part of the diffusion light applies to the opposing surface OS. When the light reflected at the opposing surface OS applies to the bar code, even though the contrast increases by applying the diffusion light in a specific direction by the block lighting, the contrast of the bar code becomes lowered as shown in FIG. 17 because the reflecting light from the opposing surface OS is affected.

Figure 18:
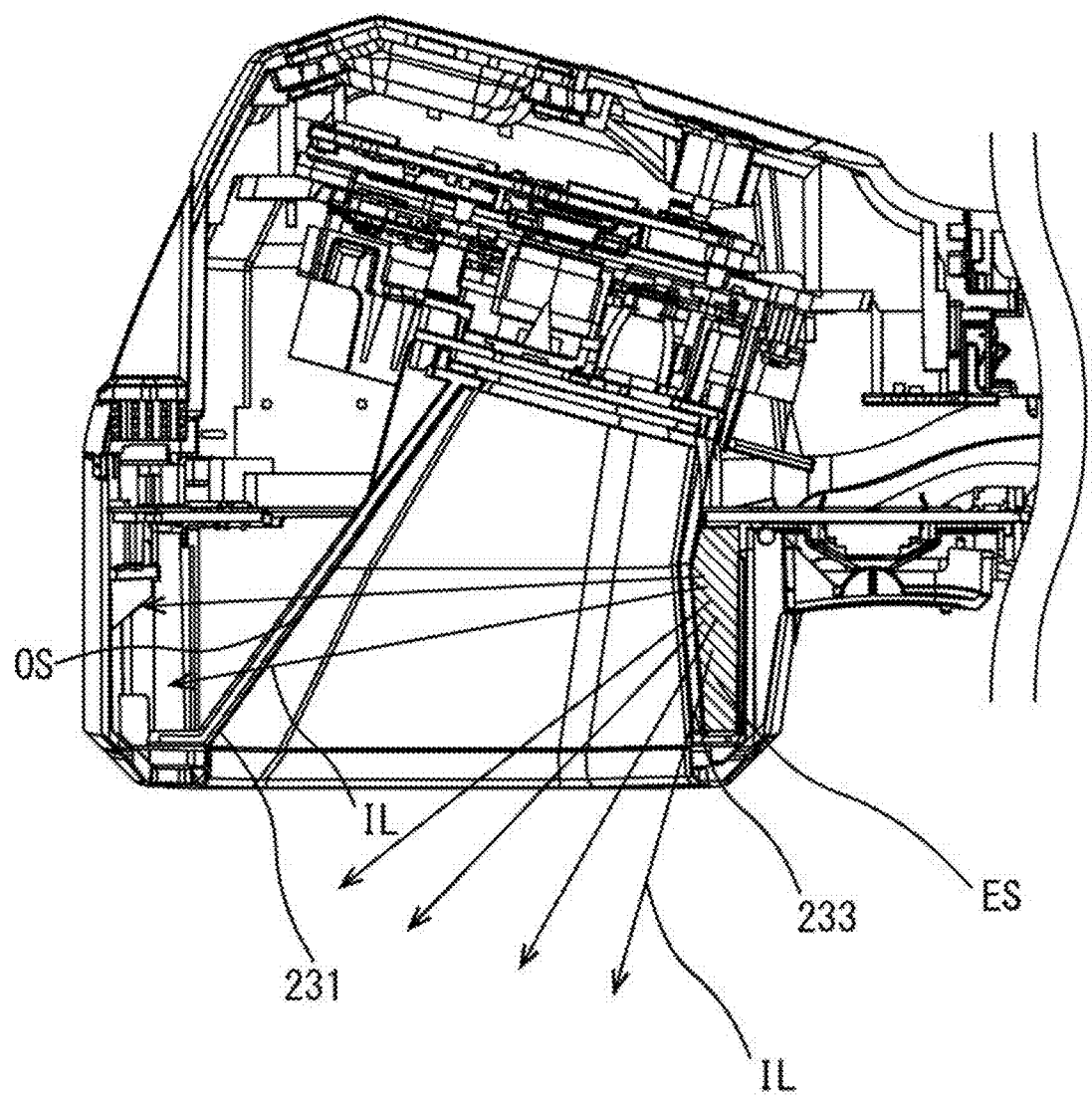
FIG. 18 is an explanatory diagram of an optical path when the diffusion plate transmits light.
Figure 19:
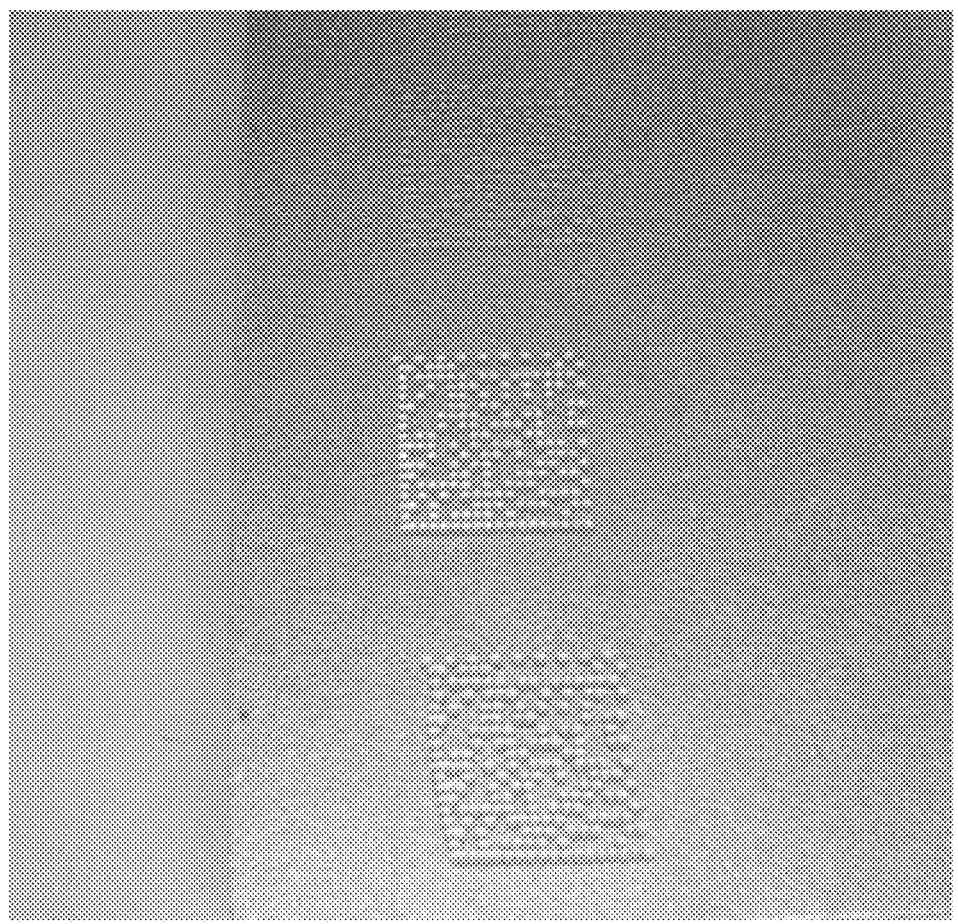
FIG. 19 is a digital image captured under lighting environment when the diffusion plate transmits light.

On the contrary, if the reflection in the opposing surface OS can be suppressed, the diffusion light from the opposing surface OS to the bar code is reduced so as to prevent the reduction of the contrast. As the method for suppressing the reflection in the opposing surface OS, as shown in FIG. 18, the diffusion light directly transmits through the opposing surface OS from the light emitting surface ES, the transmittance of the opposing surface OS can increase, for example, equal to or more than 70% in order to transmit the light through the opposing surface OS. As a result, the diffusion light from the opposing surface OS to the bar code can be reduced, and as shown in FIG. 19, the contrast of the bar code can increase.

On the other hand, it is preferable that the transmittance of the light emitting surface ES keeps equal to or less than 90% in order to emit at least the diffusion light because of the following reasons. In the diffusion plate 23, a granular diffusion material is mixed in the transparent resin so as to scatter the incident LED illumination light by the diffusion material, and therefore, the luminance of the diffusion light can be uniform. However, the amount of the diffusion material needs to be reduced in order to increase the transmittance because the diffusion light with sufficient uniform luminance cannot be emitted.

Figure 20:
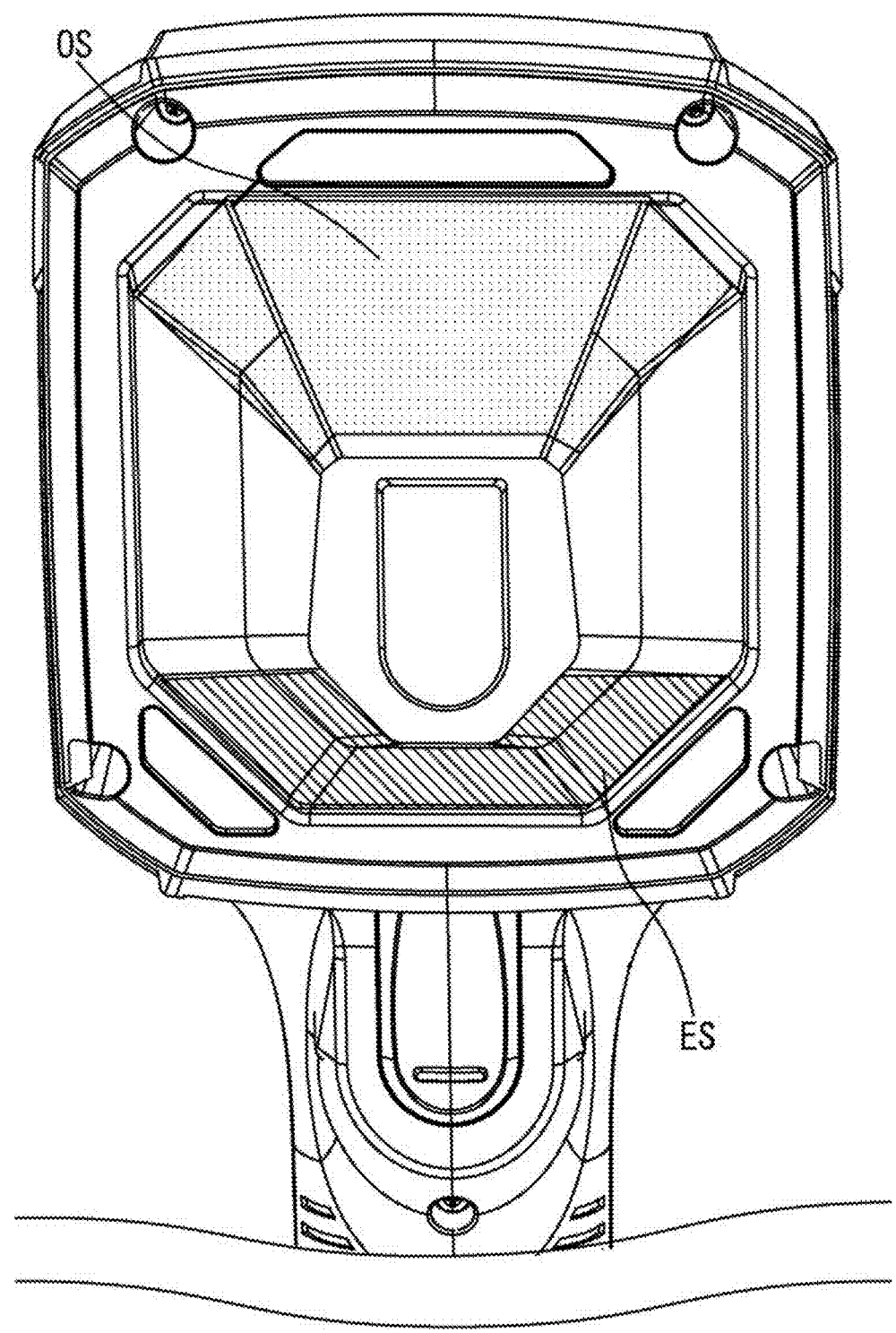
FIG. 20 is an explanatory diagram when using a material having high transmittance in the diffusion plate.
Figure 21:
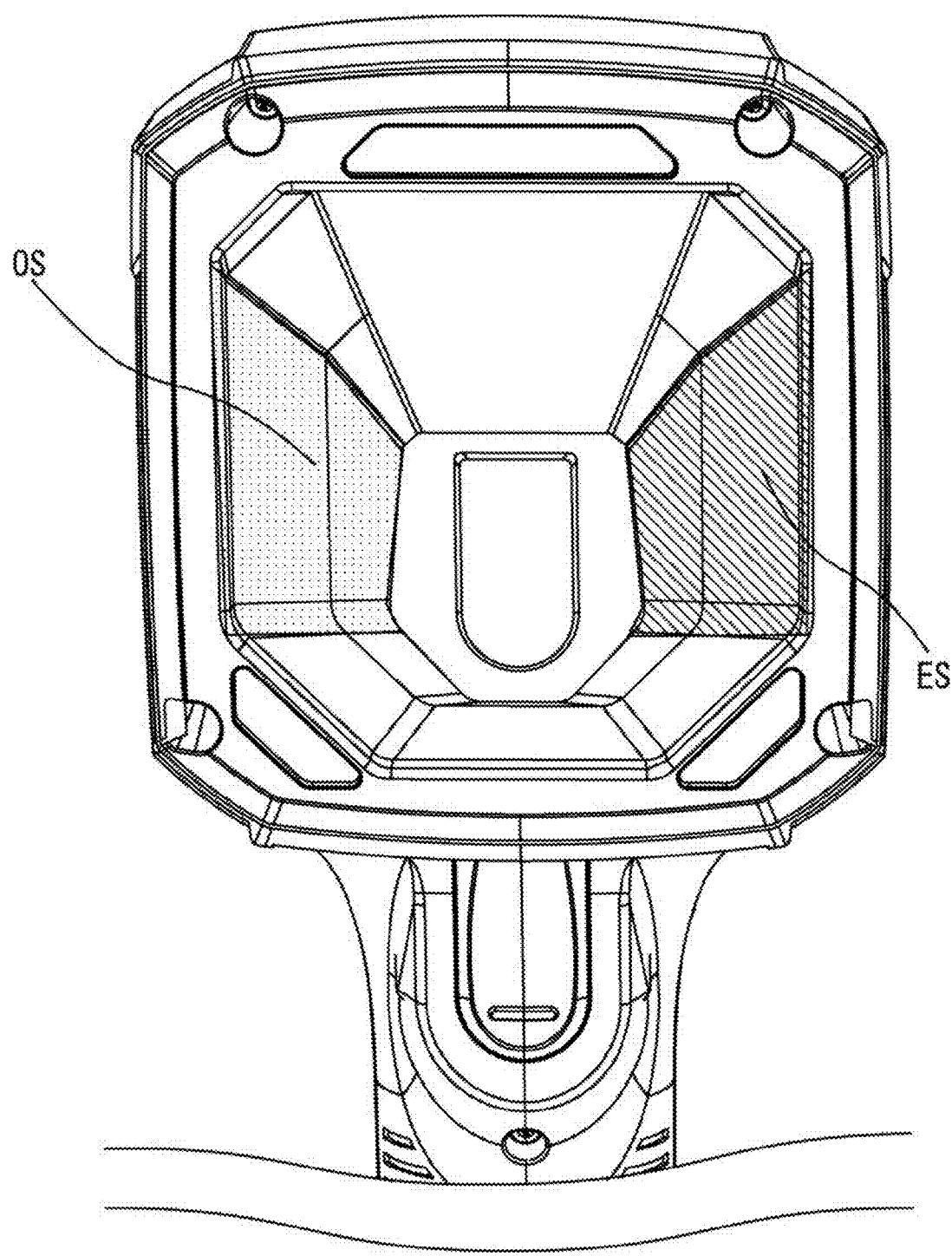
FIG. 21 is an explanatory diagram when using a material having high transmittance in the diffusion plate.

In the present embodiment, by performing block lighting, the diffusion plate 23 has both roles of the light emitting surface ES and the opposing surface OS. As shown in FIG. 20, there are two cases in which the lower side of the head part is the light emitting surface ES and the upper side of the head part is the opposing surface OS, or the upper side of the head part is the light emitting surface ES and the lower side of the head part is the opposing surface OS. Further, as shown in FIG. 21, there are two cases in which the right side of the head part is the light emitting surface ES and the left side of the head part is the opposing surface OS, or the left side of the head part is the light emitting surface ES and the right side of the head part is the opposing surface OS. Therefore, the transmittance of the diffusion plate 23 is uniformly set equal to or more than 70% and equal to or less than 90%. With this, the transmittance in any of the light emitting surface ES or the opposing surface OS satisfies from 70% to 90%, and further, the diffusion plate 23 can be made of a single material.

On the other hand, for example, in a case in which the opposing surface OS is not configured with the diffusion plate, a material which transmits all the illumination light emitted in the light emitting surface ES may be used, or a material which absorbs all the illumination light may be used. As described above, the opposing surface OS having equal to or more than 70% transmittance may be replaced with the opposing surface OS having less than 30% reflectivity. Further, in order to efficiently prevent the reflection in the opposing surface OS, the reflectivity is preferably less than 20%, and more preferably, the reflectivity is less than 10%. Further, it is preferable that the reflectivity or the transmittance is measured according to JIS standard K7375.

(Combination Structure of Diffusion Illumination and Polarized Illumination)

The polarized illumination shuts out light other than the light polarizing in a specific direction in the polarizing element for light projection, and by shutting out the light other than the light polarizing in a specific direction in which the phase of the polarizing element for light projection differs from the phase of the polarizing element for light reception by 90 degrees, it is the illumination which transmits the light polarized in both of the polarizing elements, and therefore, when a single polarizing element exists, the light amount becomes half, but there exists two polarizing elements, so that the light amount becomes quarter of the luminance amount. Therefore, conventionally, when both of the diffused illumination and the polarized illumination are used in an image processing device, the light sources, which can increase light amount, such as light sources arranged annularly are used in the polarized illumination, and further, in a case in which an image is captured under the diffused illumination, when the polarizing element for light reception exists, the light amount becomes half of the luminance amount, so that it is preferable that an image is captured by using a separate optical path for the diffused illumination and the polarized illumination. Therefore, the diffused illumination and the polarized illumination are configured in different element, and there was a problem that the device provided with these elements became large.

When the combination of the diffused illumination and the polarized illumination are realized in the handy scanner, due to the nature of the handy scanner, it is necessary to be miniaturized. In order to use the combination of the diffused illumination and the polarized illumination while miniaturizing the head part, in the present embodiment, first, an opening 2432 for light projection of the polarized illumination is provided in the rear end surface (rear surface in the orthographic drawing method. It corresponds to one example of "opening surface" in the scope of the claims) of the truncated square pyramid shaped diffusion plate 23, and in the vicinity of that, an opening 2431 for light reception of the polarized light is provided. Further, the diffused illumination is performed in the upper side surface 231 to the right side surface 234 which are the side surface of the truncated square pyramid shaped diffusion plate 23, and an optical path to the imaging part 41 is commonly used for the diffused illumination and the polarized illumination. With this, the light reception polarizing element 241 also exists in the diffused illumination. However, LED illuminations 2411 to 2415 which are high-output to the light sources can be employed, and the light amount problem is solved and there is also an advantage in which an image can be captured by a single imaging part 41, so that the miniaturization of the head part 3 is realized.

(Embodiments)

Figure 22:
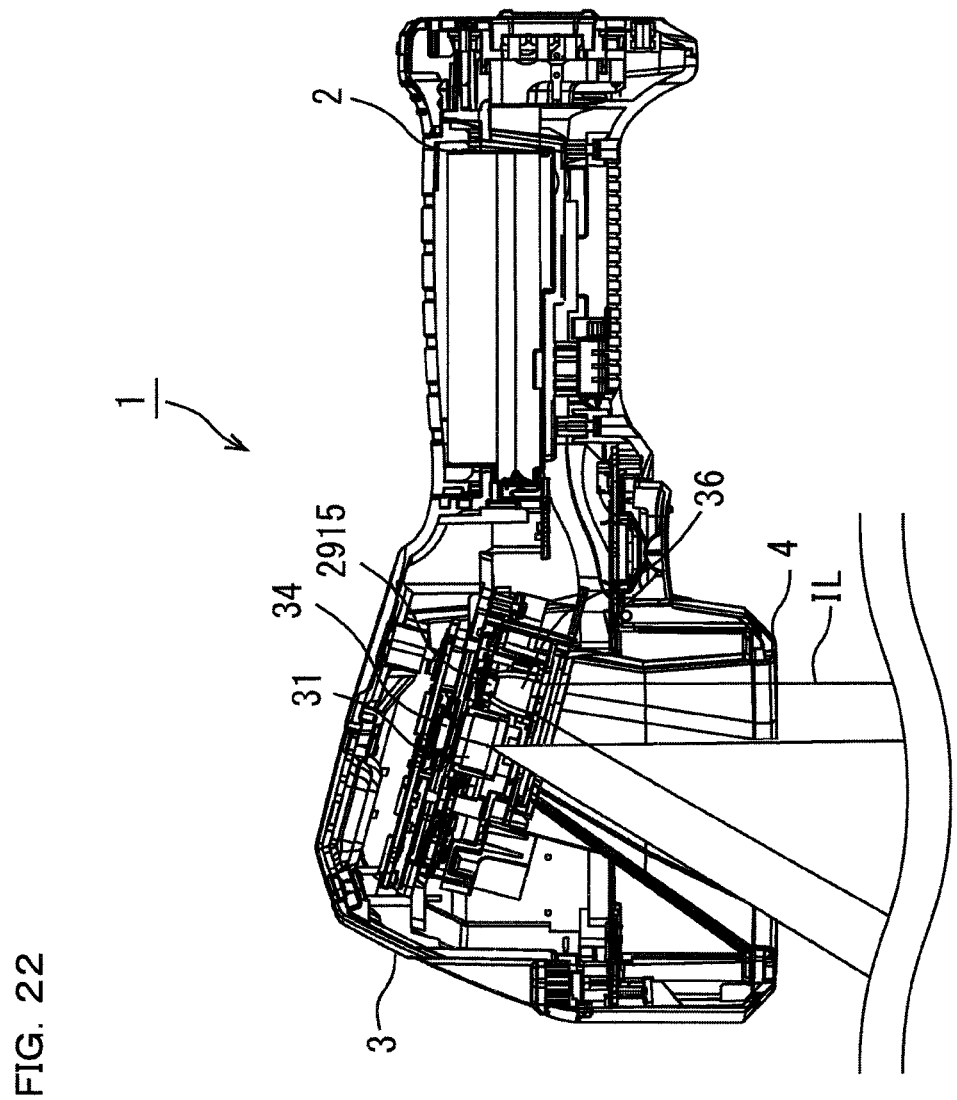
FIG. 22 is a cross-sectional view showing the handy scanner when viewed from the right side.
Figure 23:
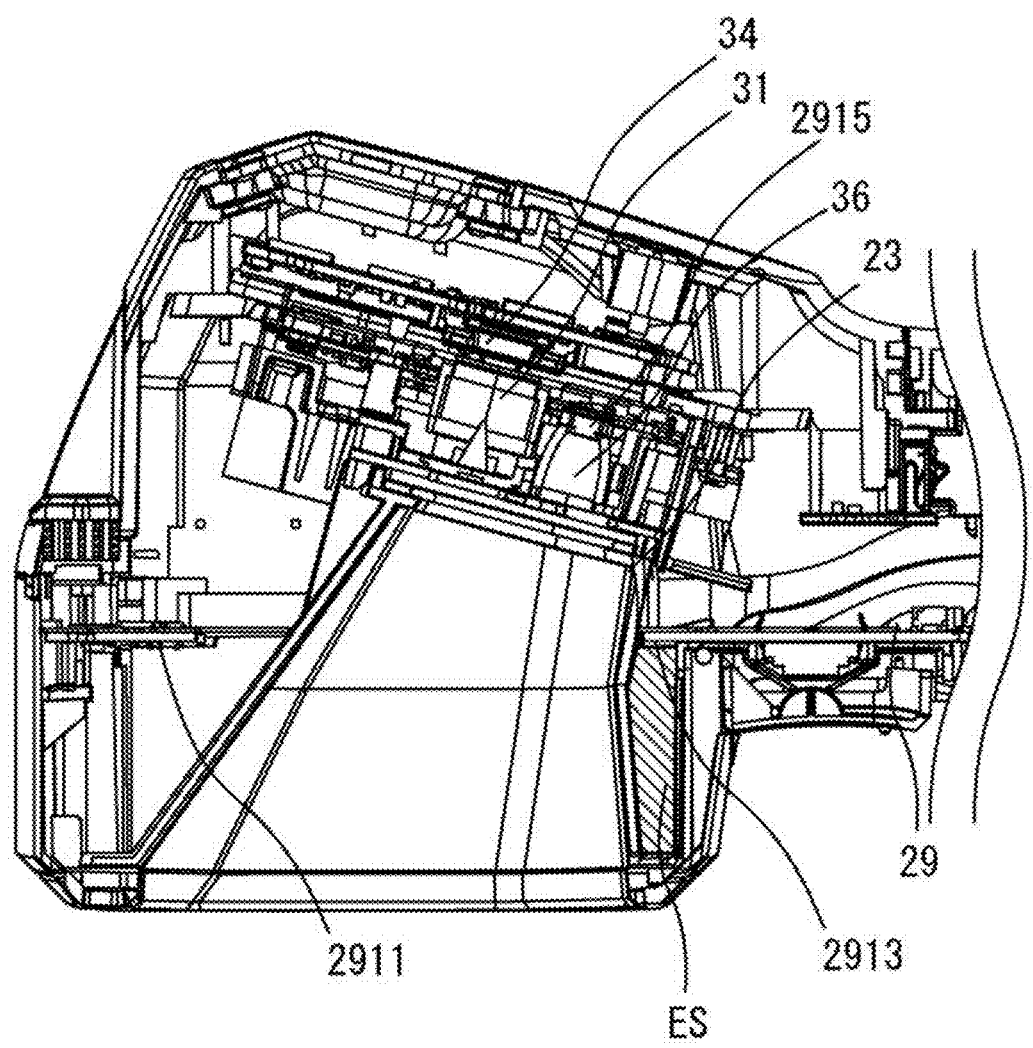
FIG. 23 is a partially enlarged cross-sectional view showing the head part of the handy scanner when viewed from the right side.

Based on the aforementioned points, the inside structure of the head part 3 and the diffusion plate 23 are described in the following embodiments. FIG. 22 is a cross-sectional view showing the handy scanner 1 when viewed in the direction of the side surface of the handy scanner 1. Further, in FIG. 23is a partial enlarged view enlarging a head part 3 of FIG. 22. As shown in these drawings, approximately truncated square pyramid shaped diffusion plate 23 is stored inside the head part 3, and the head part 3 is provided with the light receiving lens 31 in which a light image is formed in the upper bottom position of the frustum, and the CMOS image sensor 34 for providing image data from the light image. Further, the LED illumination 2915 (corresponding to one example of "second light source" in the scope of the claims), the reflector 36, and the polarizing element 24 are arranged in the upper bottom position of the frustum in a manner in which the light receiving lens 31 and the CMOS image sensor 34 become parallel. A lens may be used instead of the reflector 36 to narrow the irradiation range of the light emitted from the LED illumination 2915.

As described above, the LED illuminations 2911 to 2914 (corresponding to one example of "first light source" in the scope of the claims) are emitted in the upper side surface 231 to the right side surface 234 as a block. From the side surface, blue LED diffusion light is emitted to the bar code, but red LED illumination is emitted from the LED illumination 2915 in a reading direction of the bar code. In the LED illumination from the LED illumination 2915, by transmitting the light through the light projection polarizing element 242 of the polarizing element 24, for example, the light other than the vertically polarized light is shut out and the vertically polarized light of the LED illumination light is only transmitted. By transmitting the reflecting light reflected from a reading object through the light reception polarizing element 241 of the polarizing element 24, the light other than the horizontal polarized light is shut out and the horizontal polarized light of the LED illumination light is only transmitted. For example, with respect to the reading object which directly reflects the light as a mirror, the light projection polarizing element 242 is used at the time of projecting light, and the light reception polarizing element 241 of which the phase differs from the phase of the light projection polarizing element 242 by 90 degrees is used at the time of receiving light, and therefore, only the LED illumination light which is newly polarized between these polarizing elements can be taken by the CMOS image sensor 34. Thus, the LED illumination 2915 transmitted through the polarizing element 24 becomes an appropriate illumination for the reading object which reflects light as similar to a mirror reflection.

Figure 24:
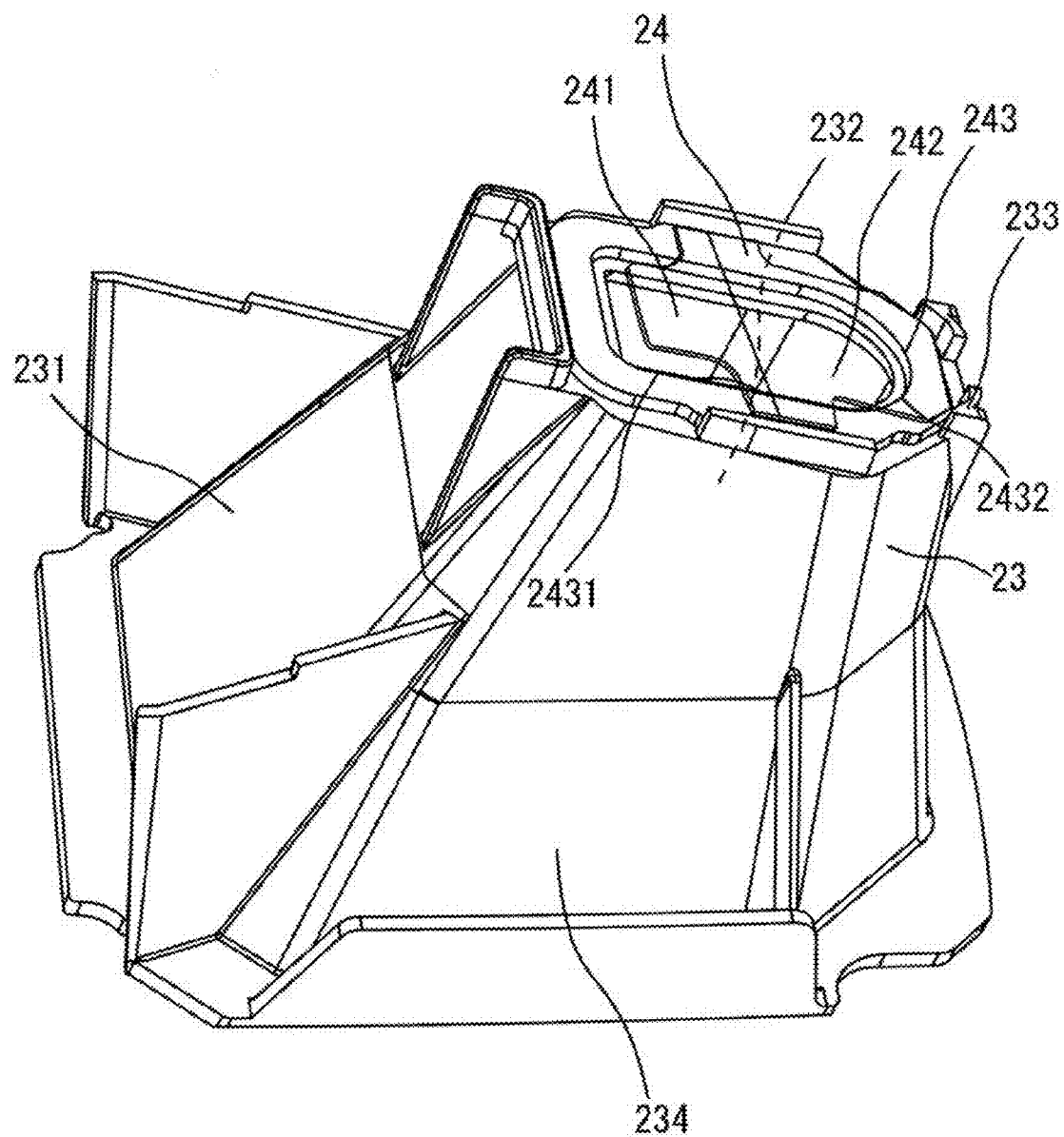
FIG. 24 is an explanatory diagram of the diffusion plate of the handy scanner.
Figure 25:
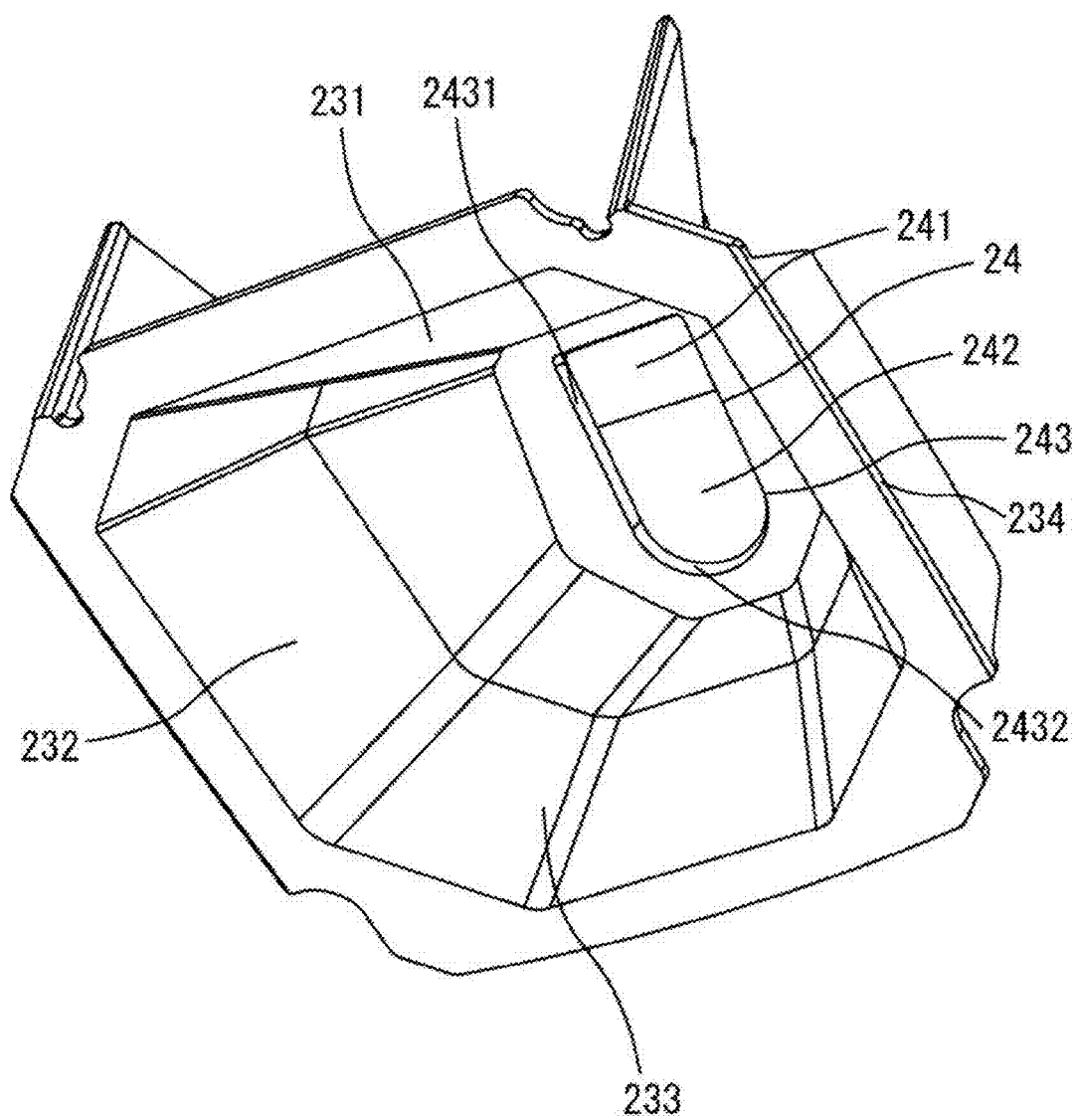
FIG. 25 is an explanatory diagram of the diffusion plate of the handy scanner.

FIGS. 24 and 25 are schematic diagrams showing a structure of the diffusion plate 23, and show the diffusion plate 23 when viewed from outside and inside, respectively. As discussed above, the diffusion plate 23 is made by mixing a granular diffusion material in the transparent resin, and has milky-white color. As shown in these drawings, it is approximate truncated square pyramid shape, and the upper bottom of the truncated square pyramid is slightly inclined downwardly. In the upper side of the pyramid surface of the quadrangular pyramid, the upper side surface 231 including an inclined side surface which opens to the upper side of the head part is formed, and in the lower side of the pyramid surface of the quadrangular pyramid, the lower side surface 233 which is approximately parallel to the imaging axis is formed below the imaging axis. Further, in the upper bottom of the quadrangular pyramid (corresponding to one example of "opening surface" in the scope of the claims"), a polarizing element window 243 for projecting light and capturing an image through the polarizing element 24 is provided. In the polarizing element window 243, the polarizing element 24 in which the light reception polarizing element 241 and the light projection polarizing element 242 are processed to be one by precisely shifting 90 degrees in the phases is arranged in a manner in which the light reception polarizing element 241 is the upper side and the light projection polarizing element 242 is the lower side. The shape of the diffusion plate 23 is not limited to the truncated square pyramid shape, and for example, it may be a frustum shape such as a dome shape, a truncated cone shape, a truncated pyramid, etc. in a manner in which the side surfaces surrounds the imaging axis. Further, with the shape of the diffusion plate 23, the imaging axis may be surrounded with no gap, or it may be surrounded with gap. That is, the imaging axis may be surrounded by a plurality of side surfaces which is spaced apart from each other.

As described above, it improves the transmittance of the diffusion plate 23. However, it is necessary to prevent the diffusion light, which is transmitted through the diffusion plate 23, from returning by the inside reflection. With this, it is possible to further improve the reading performance.

Figure 26A:
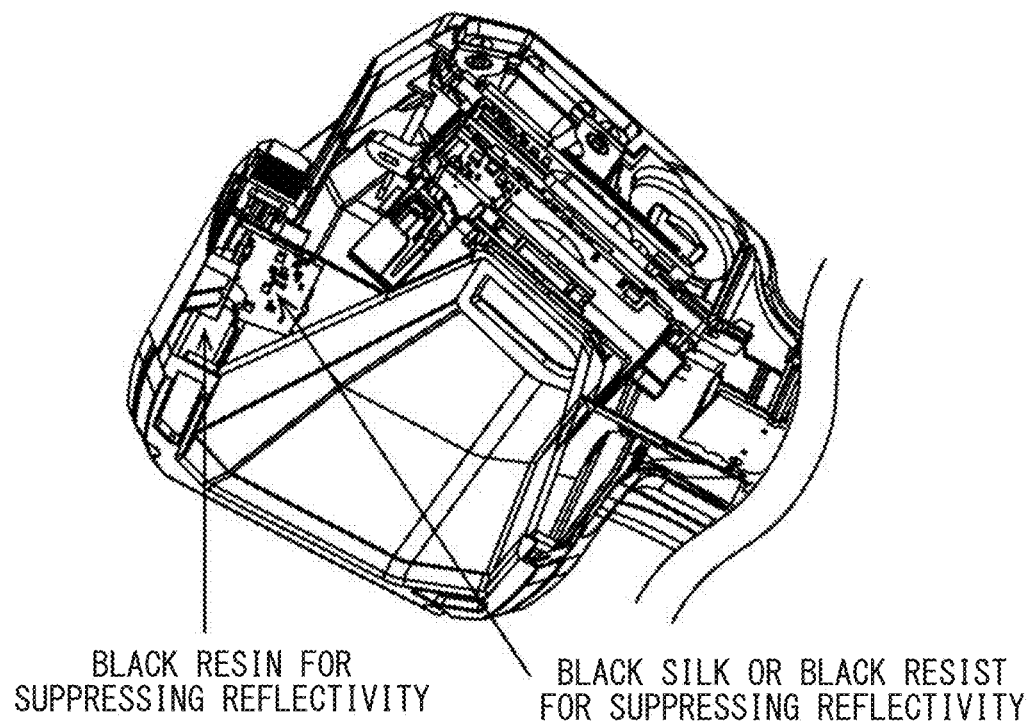
FIGS. 26A and 26B are explanatory diagrams showing the inside structure of the rear side of the diffusion plate of the handy scanner.
Figure 26B:
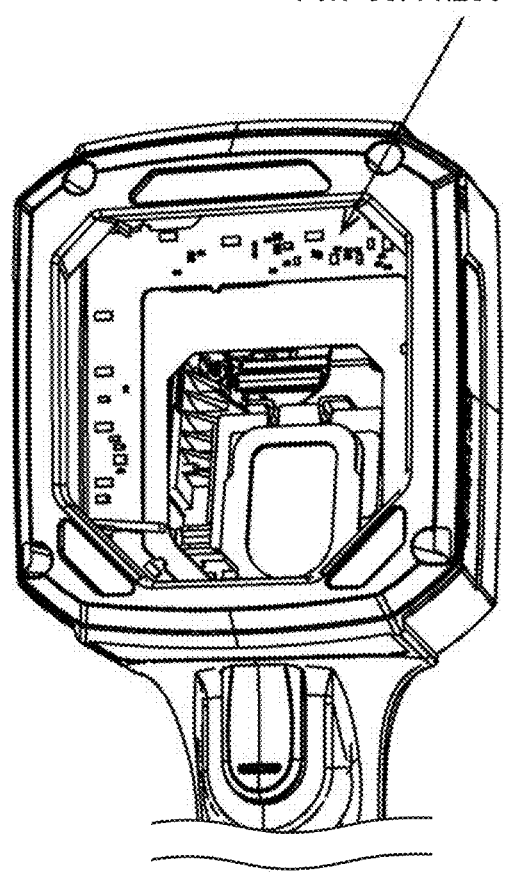

For example, as shown in FIGS. 26A and 26B, for the inside structure of the rear side of the diffusion plate 23, it is preferable to use a material which absorbs light as much as possible. In the present embodiment, in the LED illumination, although using the visible light, in this case, as a material forming the inside in the rear side of the diffusion plate 23, for example, it is preferable to use black color resin cast or black color resin. Further, it is preferable to employ black color for harnesses as much as possible. In this invention, it is assumed that LED illumination is used for the light source, but it is not limited to those emitting visible light. The illumination widely emitting electromagnetic wave including infrared light, etc. can be applied. In this case, in the inside structure of the rear side of the diffusion plate, it is not limited to the black resin cast or the black resin which is appropriate for visible light.

Figure 27:
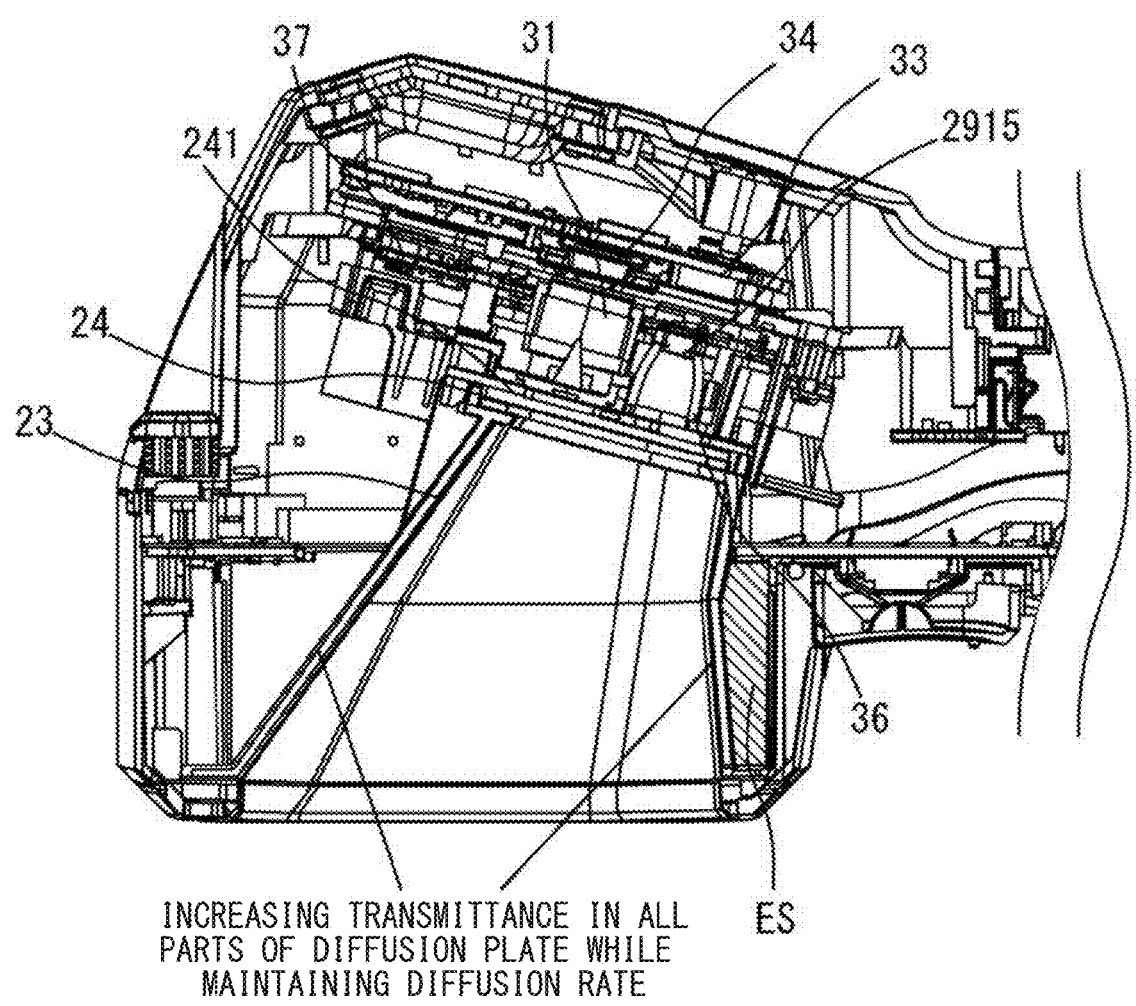
FIG. 27 is an explanatory diagram describing increase of transmittance uniformly while maintaining a diffusion rate in all parts of the diffusion plate.
Figure 28:
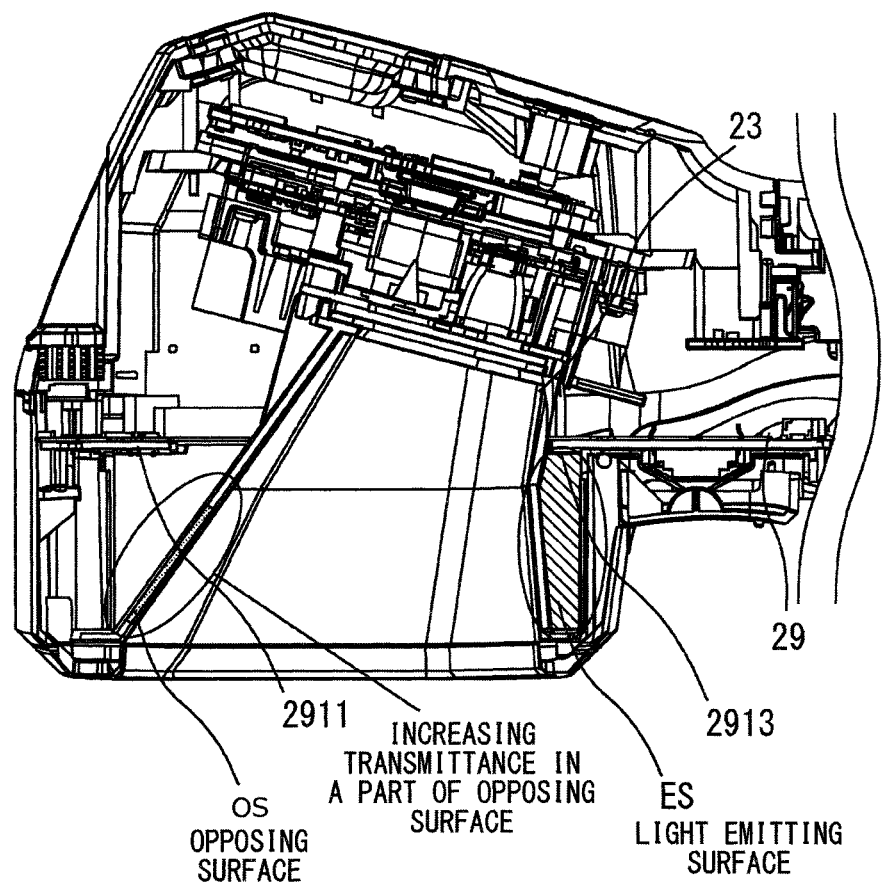
FIG. 28 is an explanatory diagram describing increase of transmittance in a part of an opposing surface which is opposed to a light emitting surface of the diffusion plate.
Figure 29:
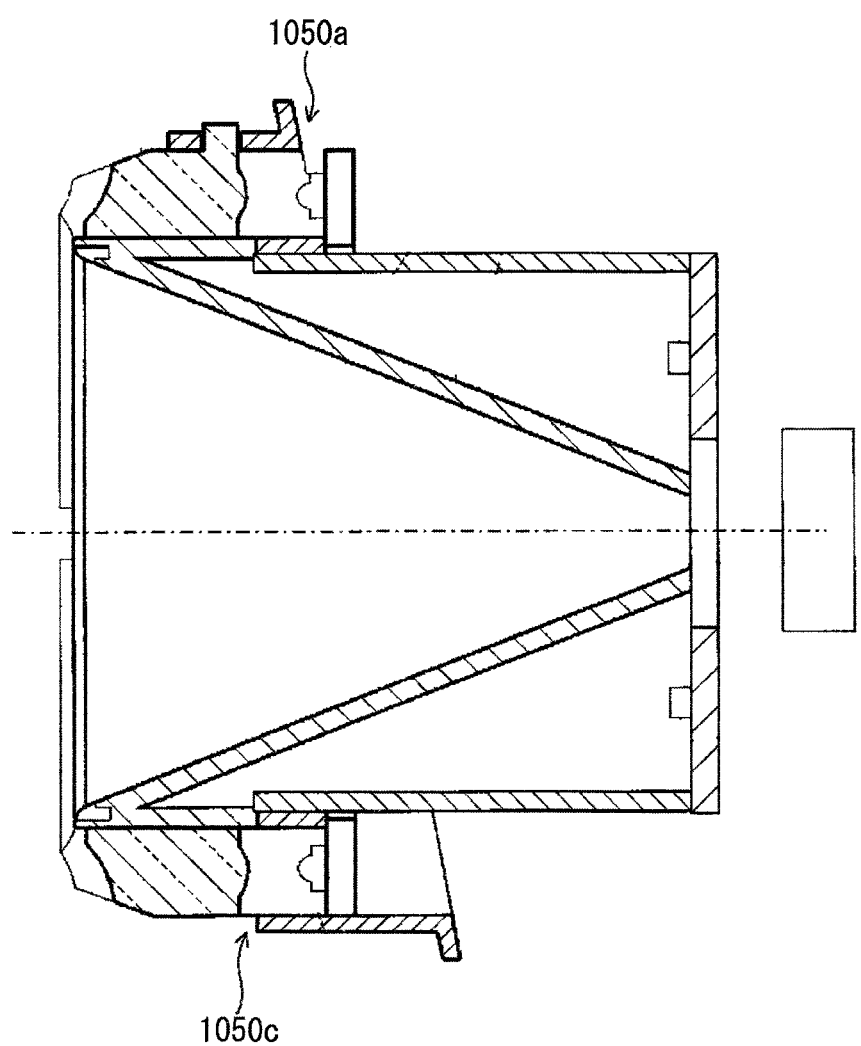
FIG. 29 is a schematic diagram showing a conventional optical information reader.
Figure 30:
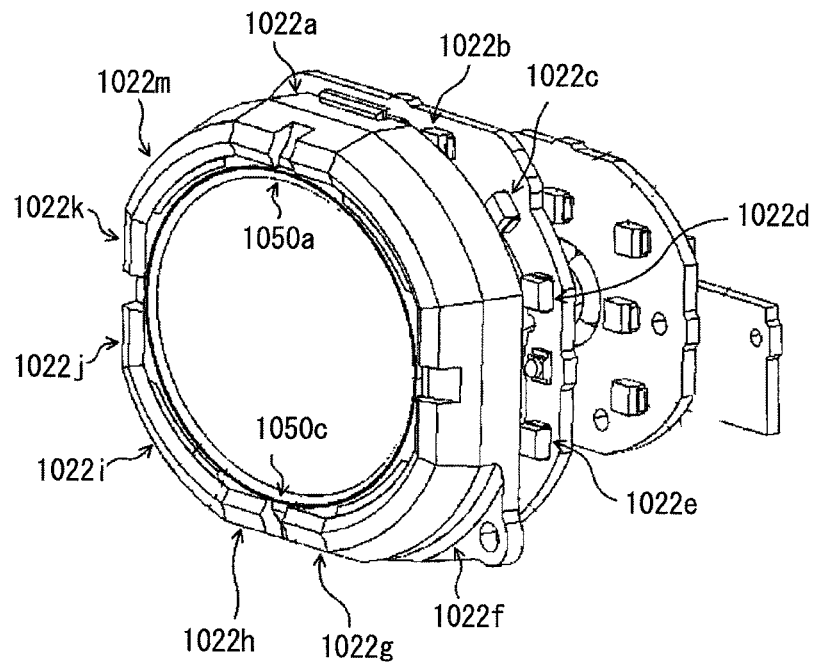
FIG. 30 is a schematic diagram showing a conventional optical information reader.
Figure 31:
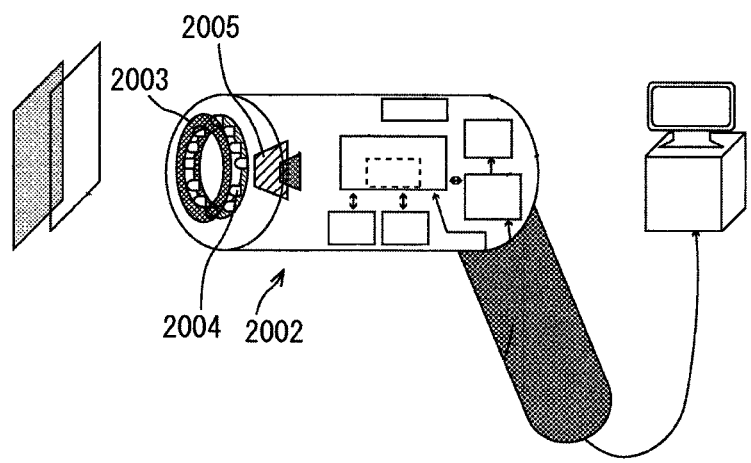
FIG. 31 is a schematic diagram showing a conventional handy type code reader.

In the present embodiment, it is assumed that the diffusion plate 23 performs block lighting, and in the same part, it is necessary to combine the roles of the light emitting surface ES and the opposing surface OS, so that as shown in FIG. 27, in all of the parts, the transmittance is uniformly equal to or more than 70% and equal to or less than 90% and it improves the transmittance while maintaining the diffusion rate. On the other hand, for example, the characteristics of the reading object are various, so that if a specific handy scanner is required for a reading characteristic, as another embodiment, as shown in FIG. 28, there is a case in which the transmittance of a part corresponding to the opposing surface OS which faces to the light emitting surface ES only increases more than 70%.

By increasing the transmittance of the opposing surface OS more than 70%, the contrast of the reading code (image) in a case of the polarized illumination can also increase. Concretely, in a case in which white color code is read by the polarized illumination, when the opposing surface OS is darker, the contrast of the reading code (image) increases. Therefore, by combining the light source such as the LED illumination 2915, etc. and the opposing surface having the transmittance more than 70%, it is possible to improve the reading performance.

INDUSTRIAL APPLICABILITY

The present invention relates to a portable optical reader contributing miniaturization of a handy scanner while realizing both of diffused illumination and polarized illumination, and having industrial applicability.

What is claimed is:
1. A portable optical reader comprising:
a head part illuminating light to a symbol which is a reading object and having a reading port through which light reflected on the symbol passes; and
a holding part connected to the head part and extending in a direction away from the head part,
wherein the head part includes:
an illumination substrate;
a plurality of light source annularly arranged on the illumination substrate, the plurality of light source located on a reading port side of the illumination substrate;
a second light source emitting light for polarization to the symbol;
a light projection polarizing element polarizing the light emitted from the second light source;
a member arranged inside the plurality of light source and having a side surface and a bottom surface to form a frustum shape or a dome shape, the side surface including a light emitting surface being formed on the reading port side of the illumination substrate located apart from the bottom surface, the light emitting surface diffusing the light from the plurality of first light source and illuminating diffusion light to the symbol,
the bottom surface a) having a light projection opening through which polarized light from the light projection polarizing element passes and b) having a light reception opening through which reflected light from the symbol passes;
a light reception polarizing element polarizing the reflected light passing through the light reception opening; and
an imaging part generating an image of the symbol by receiving the reflected light by the light reception polarizing element.

2. The portable optical reader according to claim 1, wherein the light projection opening is provided in vicinity of the light reception opening on the bottom surface.

3. The portable optical reader according to claim 2, wherein the light reception opening and the light projection opening form a single opening.

4. The portable optical reader according to claim 2, wherein the light reception opening and the light projection opening are separately provided side-by-side.

5. The portable optical reader according to claim 2, wherein the light reception polarizing element and the light projection polarizing element are provided as a single member in which two polarizing elements have phases that differ from each other by 90 degrees.

6. The portable optical reader according to claim 1, wherein the light reception polarizing element and the light projection polarizing element are fixed to the member, respectively.

7. The portable optical reader according to claim 1, wherein
the bottom surface is provided in a front side of the imaging part inside the head part; and
the side surface surrounds an imaging axis of the imaging part and being provided in a manner in which the plurality of light source are positioned outside the member;
where the light reception opening and the light projection opening are formed in the bottom surface.

8. The portable optical reader according to claim 7, wherein the light source is provided below the bottom surface of the member inside the head part.

9. The portable optical reader according to claim 1, further comprising: a reflector or a lens, which narrows an irradiation range of the light emitted from the second light source, and which is provided between the light source and the light projection polarizing element.

* * * * *